United States Patent [19]

Hanser

[11] Patent Number: 4,805,253
[45] Date of Patent: Feb. 21, 1989

[54] DEVICE FOR BRUSHING THREADED BORES

[75] Inventor: Patrick E. L. Hanser, Yerres, France

[73] Assignee: Creation de Mechanismes, d'Automatismes et d'Asservissements, Epinay-sur-Orge, France

[21] Appl. No.: 161,065

[22] Filed: Feb. 26, 1988

[30] Foreign Application Priority Data

Feb. 26, 1987 [FR] France ................................ 87 02565

[51] Int. Cl.$^4$ ......................... A46B 13/02; B08B 1/04
[52] U.S. Cl. .................................. 15/246.5; 15/21 E; 15/104.1 R; 15/246; 51/43
[58] Field of Search .............. 15/21 R, 21 E, 104.1 R, 15/246, 246.5; 51/43; 29/DIG. 7, DIG. 98; 83/168

[56] References Cited

U.S. PATENT DOCUMENTS 4,419,847  12/1983  Duverne ..................... 15/104.1 R
4,485,517  12/1984  Voigt ................................ 15/21 R Primary Examiner—Edward L. Roberts
Attorney, Agent, or Firm—Pollock, Vande Sande & Priddy

[57] ABSTRACT

A device for brushing threaded bores comprises a mobile assembly on which is a brush rotatable about a main axis parallel to the axis of the threaded bore to be brushed. The brush is rotated about this main axis and at the same time the mobile assembly is moved along a helical path centered on the axis of the threaded bore.

25 Claims, 15 Drawing Sheets

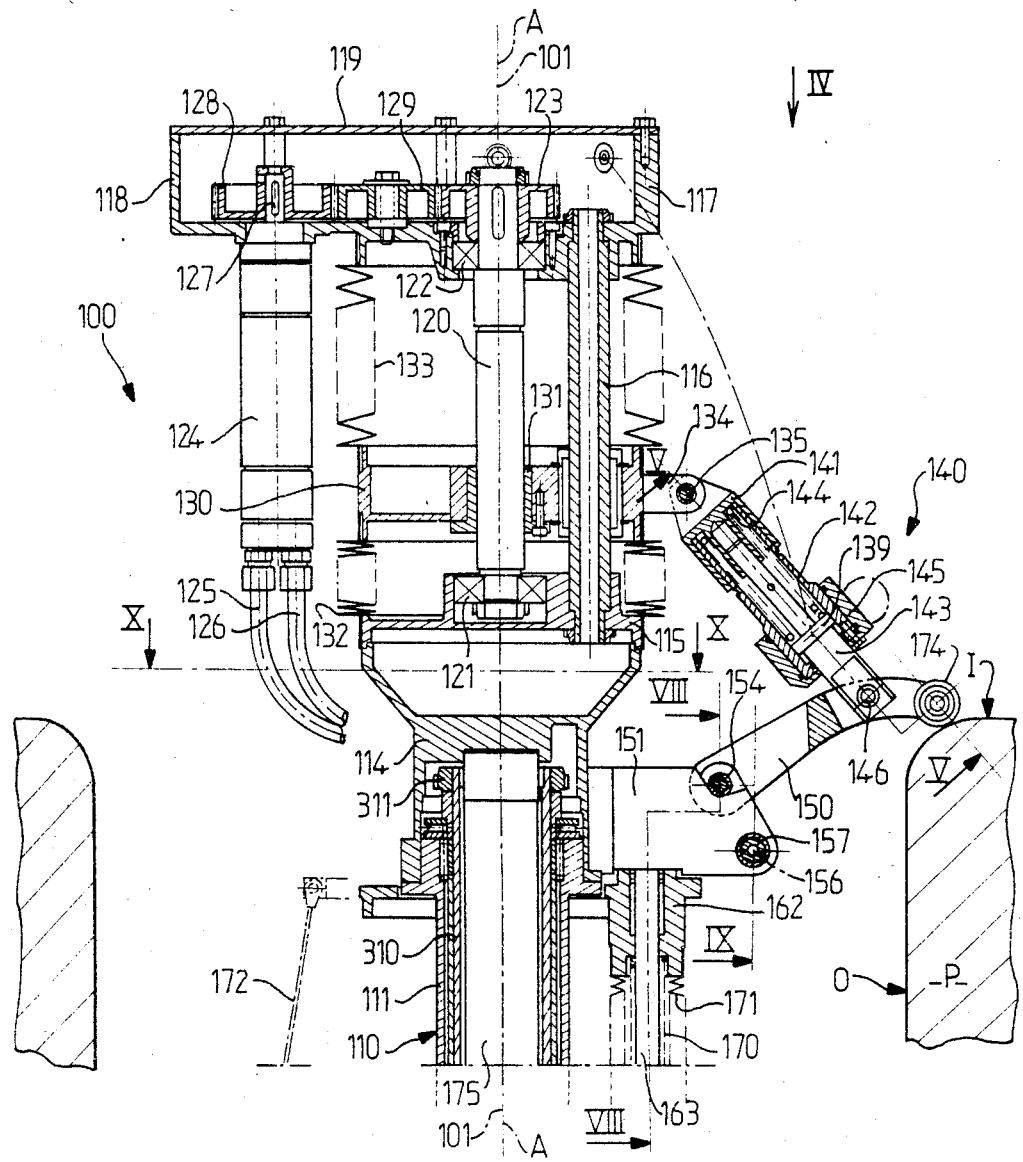
FIG_1 A

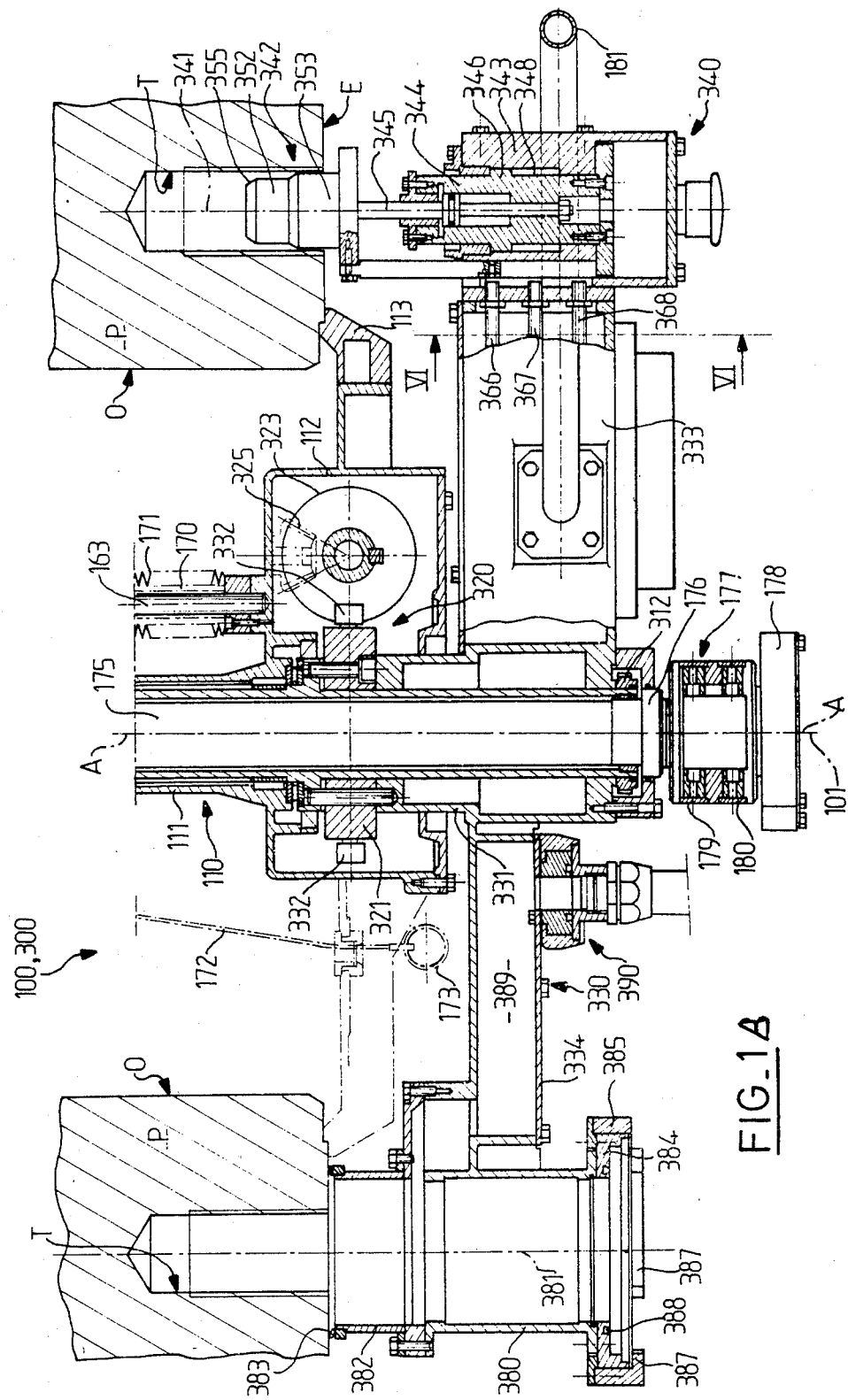
FIG_1B

FIG_3

FIG.5
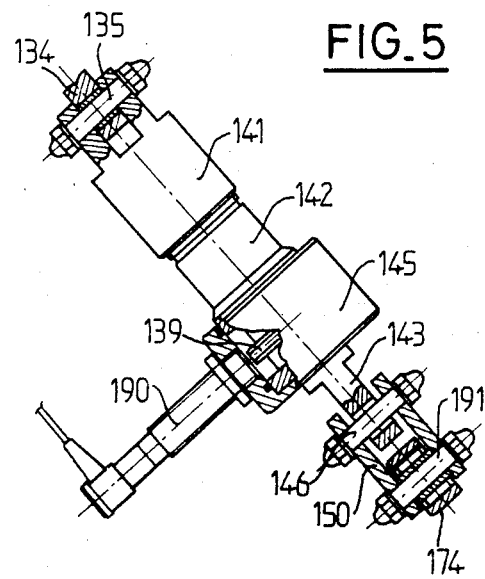
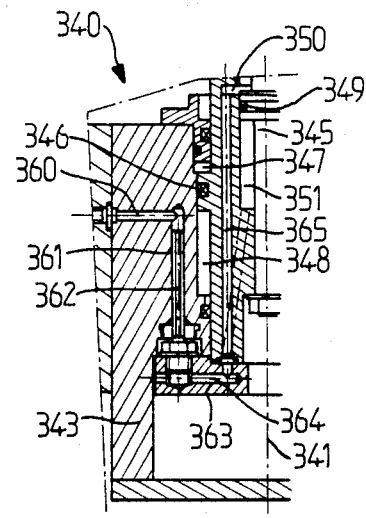
FIG.7
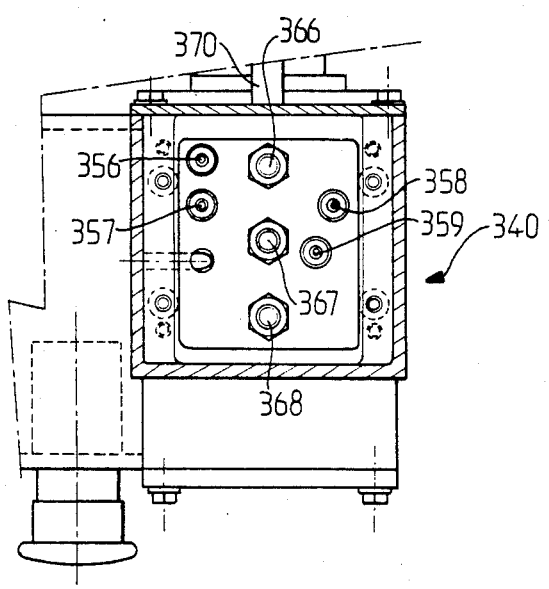
FIG.6

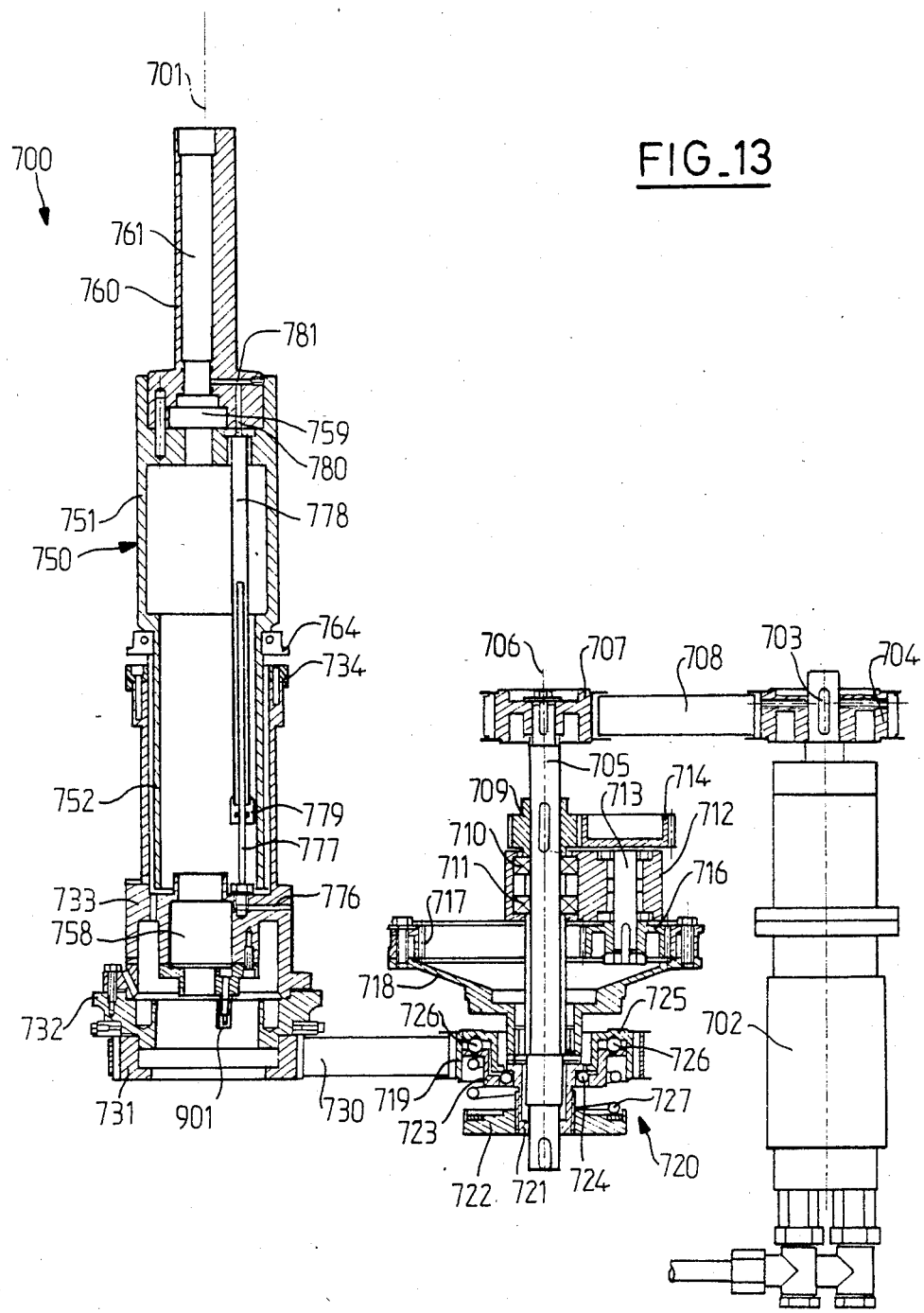
FIG_13

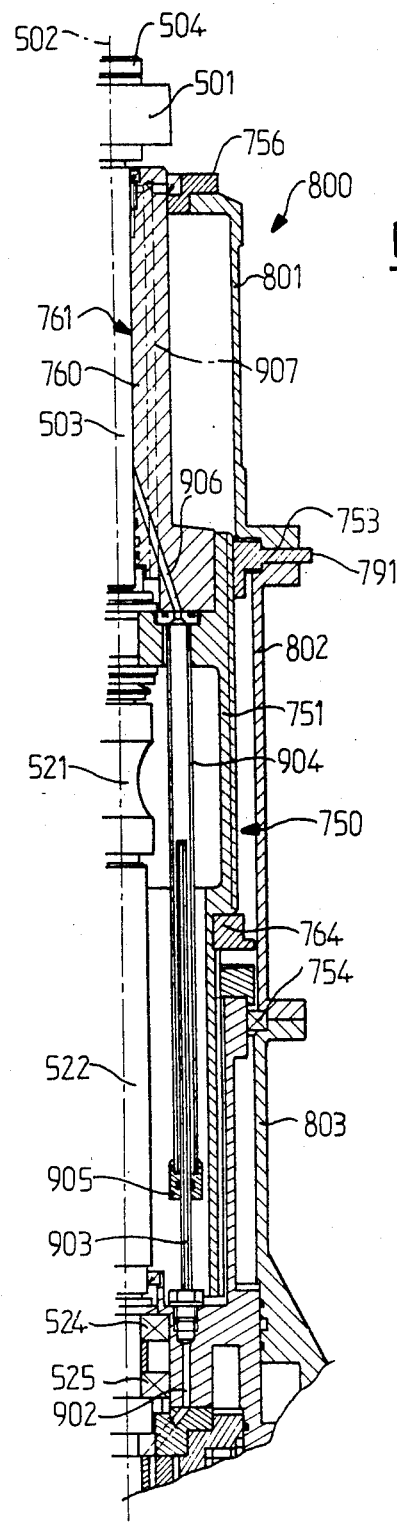
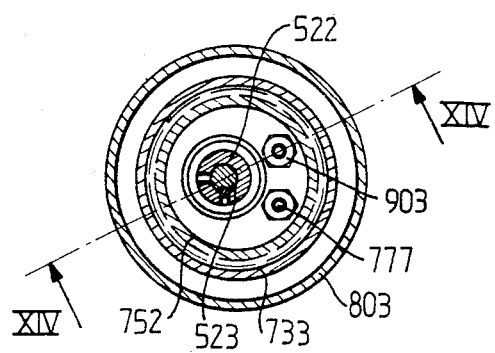
FIG_14
FIG_15

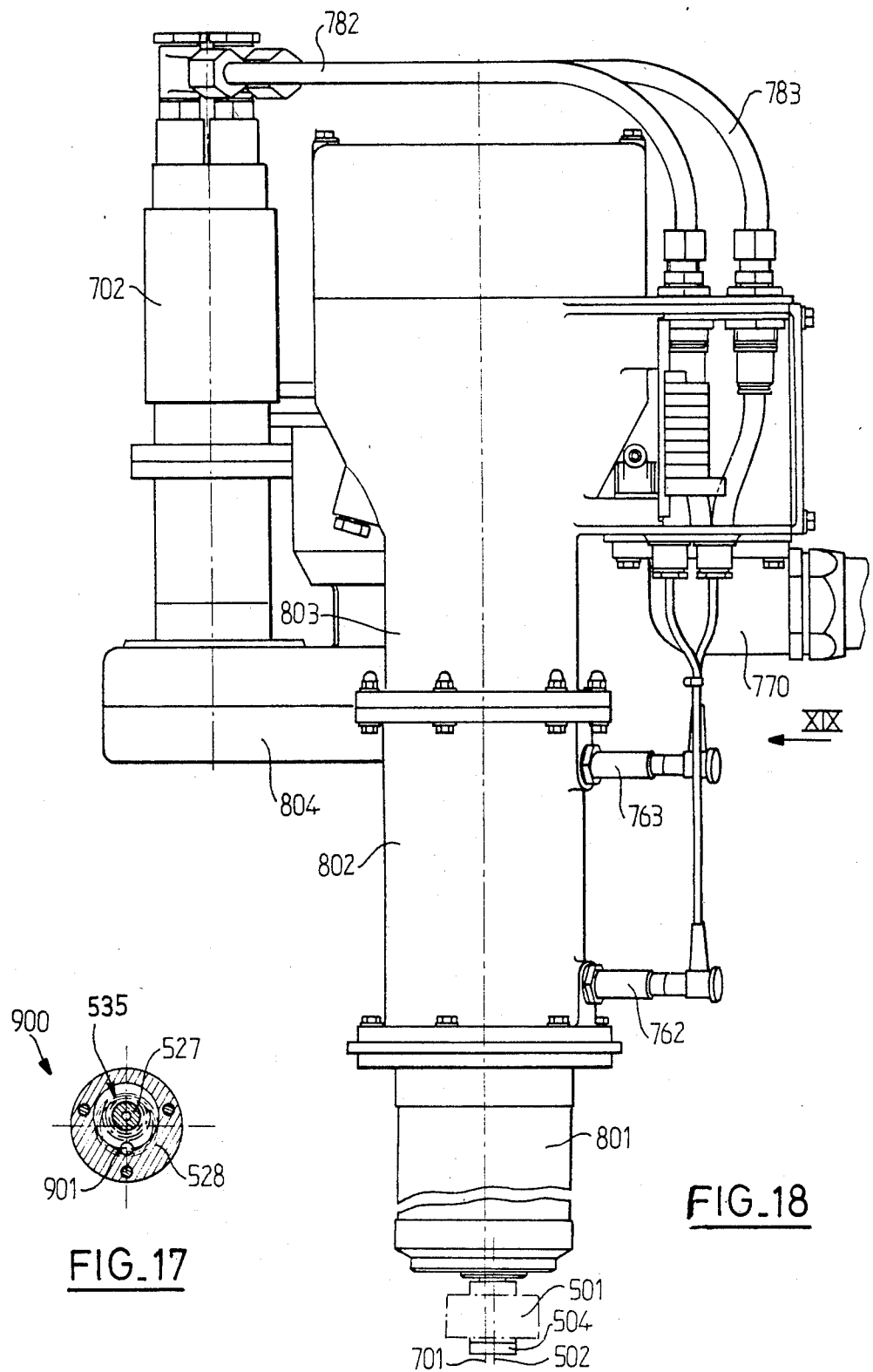
FIG_17
FIG_18

DEVICE FOR BRUSHING THREADED BORES

BACKGROUND OF THE INVENTION

1. Field of the invention

The present invention concerns brushing devices.

To be more precise, the present invention concerns a brushing device designed for brushing threaded bores, especially the threaded bores surrounding access openings for enclosures and intended for fixing the traps closing off these openings, particularly but not exclusively for nuclear power station steam generators and pressurizers.

The present invention finds applications in brushing threaded bores associated with manholes, viewing holes and hand access holes, these various openings differing from each other only in terms of their size.

2. Description of the prior art

The various brushing devices proposed until now are not entirely satisfactory.

A first object of the present invention is to propose a brushing device that functions entirely automatically, that is to say one that does not require any manual intervention after the brushing device is fitted into place.

Another object of the present invention is to propose a lightweight brushing device.

Another object of the present invention is to propose a brushing device adapted to be fitted into place quickly and precisely.

Another object of the present invention is to propose a brushing device that can be used to brush various threaded bores of various pitches without any particular difficulty.

SUMMARY OF THE INVENTION

In one aspect, the present invention consists in a device for brushing threaded bores, comprising a mobile assembly, a brush on said mobile assembly rotatable about a main axis parallel in use to the axis of said threaded bore, main drive means for rotating said brush about said main axis and auxiliary drive means for moving said mobile assembly along a helical path centered in use on said axis of said threaded bore.

The mobile assembly fitted with the brush and the auxiliary drive means are preferably driven by the same pneumatic drive motor.

The auxiliary drive means advantageously comprise a clutch adapted to serve as a torque limiter.

The auxiliary drive means preferably comprise a screw adapted to be rotated about an axis coincident in use with the axis of said threaded bore, a nut meshing with said screw and a fixed casing carrying said nut which carries said mobile assembly, the arrangement being such that in use said main axis is spaced from and rotates about the axis of said threaded bore.

In another aspect, the present invention consists in support apparatus for a device for brushing threaded bores, comprising a mobile assembly, a brush on said mobile assembly rotatable about a main axis parallel in use to the axis of said threaded bore, main drive means for rotating said brush about said main axis and auxiliary drive means for moving said mobile assembly along a helical path centered in use on said axis of said threaded bore, said apparatus being adapted to be fixed into an orifice in a wall and comprising a fixed frame, a system of jaws on said frame adapted to come into contact with a first surface of the wall, a plurality of claws on said fixed frame, and drive means adapted to displace said claws between an idle, retracted position in which said claws are able to pass through said orifice and an operative, extended position in which said claws bear against a second surface of the wall, at the periphery of said orifice.

By virtue of this arrangement, secure and precise positioning of the brushing device is obtained automatically.

The support apparatus preferably further comprises a mobile frame adapted to carry said brushing device, supported on said fixed frame and freely rotatable about a pivot axis coincident in use with the axis of said orifice, and secondary drive means adapted to procure controlled pivoting of said mobile frame about said pivot axis.

Other characteristics, objects and advantages of the present invention will emerge from the following detailed description given by way of non-limiting example only with reference to the appended drawings.

BRIEF DESCRIPTION OF THE DRAWINGS

FIG. 1 shows a general schematic view of support apparatus according to the present invention in longitudinal cross-section on the non-coplanar cross-section planes denoted I—I in FIG. 4. For convenience the figure is divided into two parts, FIG. 1A showing the upper part of the apparatus and FIG. 1B showing the lower part.

FIG. 5 shows a detailed view, in partial cross-section on non-coplanar cross-section planes denoted V—V in FIG. 1, of a spring link associated with the claws.

FIG. 6 shows a detailed view of the mobile frame of the support apparatus in cross-section on the plane denoted VI—VI in FIG. 1.

FIG. 7 shows another detail view of the mobile frame of the support apparatus on non-coplanar cross-section planes denoted VII—VII in FIG. 4.

FIG. 13 shows in an identical view the auxiliary drive means which drive the aforesaid assembly with a helical motion.

FIG. 14 shows the brushing device in longitudinal cross-section on the cross-section plane denoted XIV—XIV in FIG. 15.

FIG. 15 shows a view of the brushing device in transverse cross-section on the cross-section plane denoted XV—XV in FIG. 11.

FIG. 17 shows a view of the brushing device in transverse cross-section on the cross-section plane denoted XVII in FIG. 11.

FIG. 18 shows an exterior view of the casing in which the brushing device is accommodated.

DESCRIPTION OF THE PREFERRED EMBODIMENT

Figure 4:
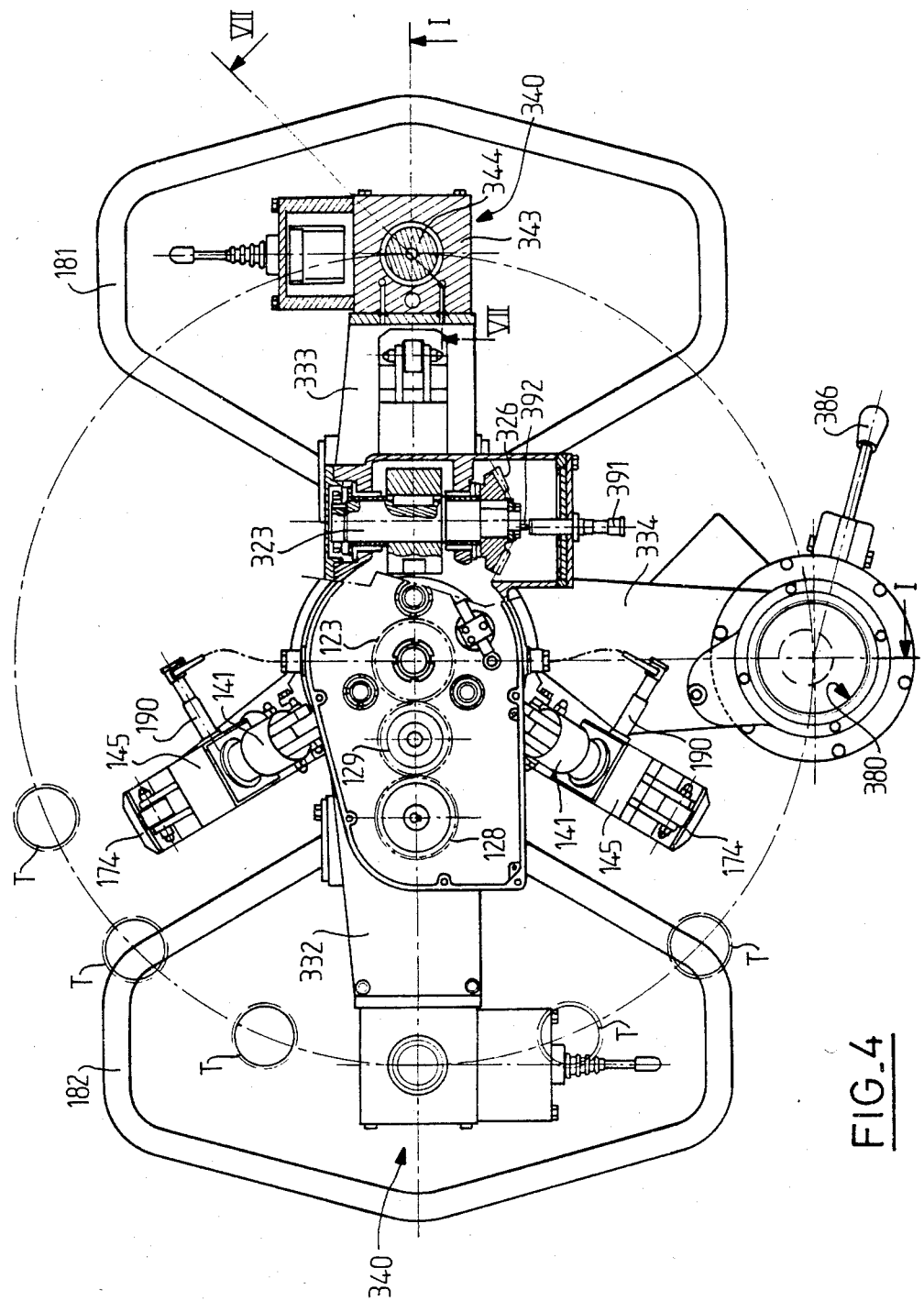
FIG. 4 shows an axial view of the support apparatus in accordance with the present invention as seen in the direction of the arrow IV in FIG. 1, the covers having been removed from some casings for a clearer representation.

FIGS. 1 and 4 show the wall P of an enclosure provided with a cylindrical orifice O such a manhole. The axis of the orifice O is designated A—A. The respective opposite surfaces of the wall P, which extend transversely to the axis A—A, are respectively designated E and I. The surface E constitutes the external surface of the enclosure. The surface I constitutes the internal surface of the enclosure.

The wall P comprises a plurality of threaded bores T. These threaded bores T are designed to receive studs or equivalent means for fixing a sealed access trap over the orifice O. The threaded bores T open onto the external surface E and their axis is parallel to the axis A—A of the orifice O. The threaded bores T are equi-angularly distributed about the axis A—A. There are 16 of them in the embodiment shown in FIG. 4, but this embodiment is not limiting in any way, of course.

As previously indicated, the object of the invention is to propose a device for brushing out in succession each of the threaded bores T.

For this the invention proposes the brushing device shown in FIGS. 11 through 21 associated with the support apparatus shown in FIGS. 1 through 10.

Figure 3:
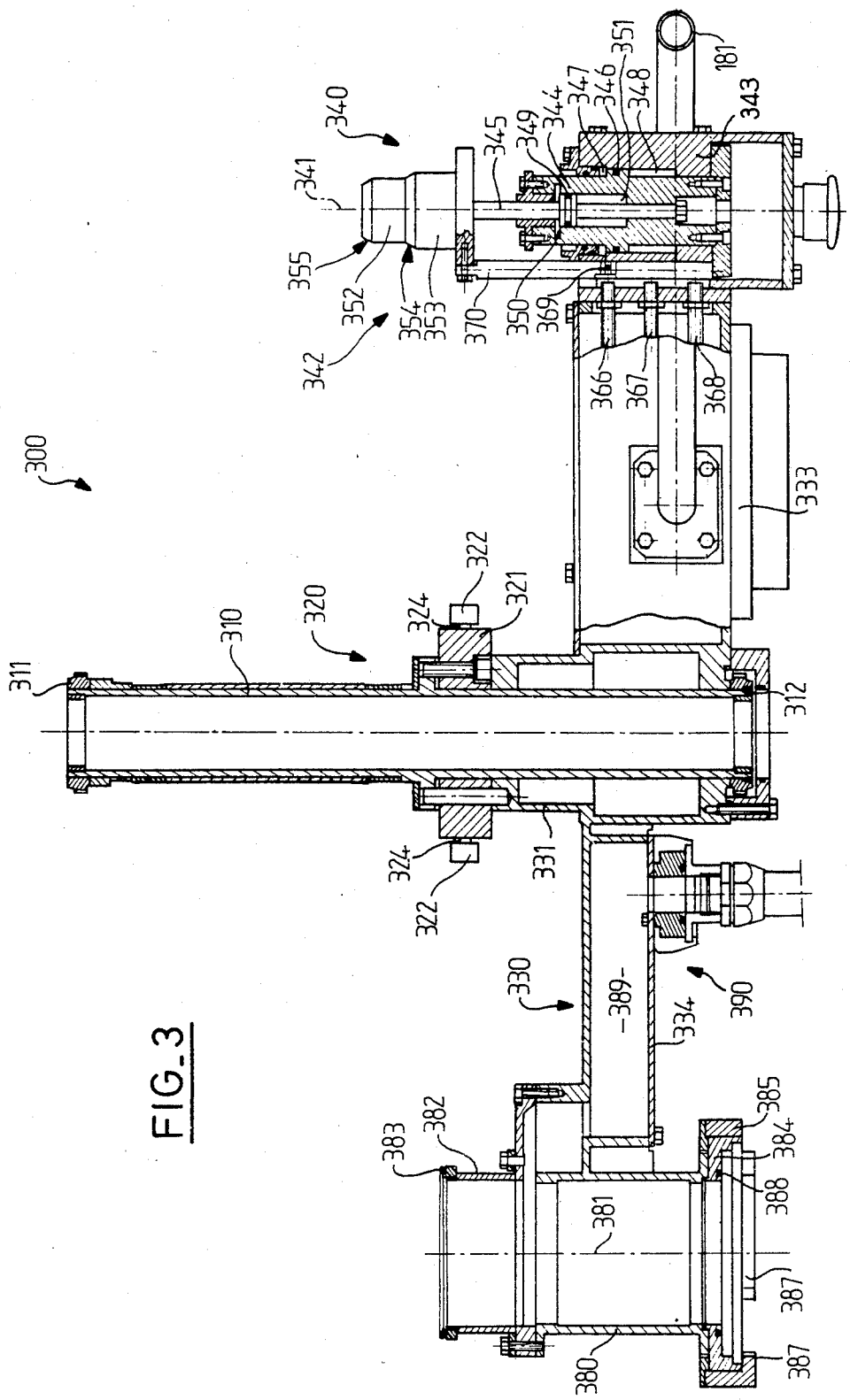
FIG. 3 shows in an identical view the structure of the mobile frame of the support apparatus in accordance with the present invention.

As previously indicated, the support apparatus essentially comprises a fixed frame 100 designed to be fixed into the orifice O against the wall T and a mobile frame 300 shown in FIG. 3 supported by the fixed frame 100 to rotate about the axis A—A and itself carrying the brushing device shown in FIGS. 11 through 21. The fixed frame 100, offered up to the external surface E, is inserted into the orifice O.

In the remainder of this description terms like "front" and "back" are to be understood as referring to the direction in which the fixed frame 100 is moved to insert it into the orifice O.

FIXED FRAME 100

The fixed frame 100 has a longitudinal axis of symmetry 101. In use this axis 101 is coincident with the axis A—A of the orifice O.

The fixed frame 100 comprises a base 110. This essentially consists of a barrel 111 centered on the axis 101 and a casing 112. The casing 112 carries centering jaws 113. These extend radially relative to the axis 101. They are designed to bear against the external surface E. The centering jaws 113 may comprise a continuous ring centered on the axis 101 or alternatively a plurality of lugs equi-angularly distributed around the axis 101 and extending radially relative to it.

At the end opposite to the casing 112, towards the front, the barrel 111 carries a spacer 114 centered on the axis 101 which in turn carries at the front a flange plate 115. The flange plate 115 extends transversely to the axis 101. It carries on the side opposite the base 110 three columns 116. The columns 116 are parallel to the axis 101 and are equi-angularly distributed about it. The columns 116 carry at their second or front end a second flange plate 117 delimiting a casing 118. The casing 118 is closed off by a cover 119.

The flange plates 115, 117 support a screw 120 freely rotatable about the axis 101. The screw 120 is guided in rotation in bearings 121, 122 respectively carried by the flange plates 115 and 117.

The screw 120 extends into the interior of the casing 118. Its end inside the casing 118 carries a driven toothed wheel 123.

The casing 118 carries a pneumatic motor 124. The motor 124 is supplied via pipes 125, 126. The output shaft 127 of the motor 124 is parallel to the axis 101. It extends inside the casing 118 and carries a driving toothed wheel 128.

The casing 118 also carries an intermediate toothed wheel 129 freely rotatable about an axis parallel to the axis 101. The intermediate toothed wheel 129 meshes with the driving toothed wheel 128 and the driven toothed wheel 123 so as to rotate the screw 120 about the axis 101 when the pneumatic motor 124 is operated.

Figure 2:
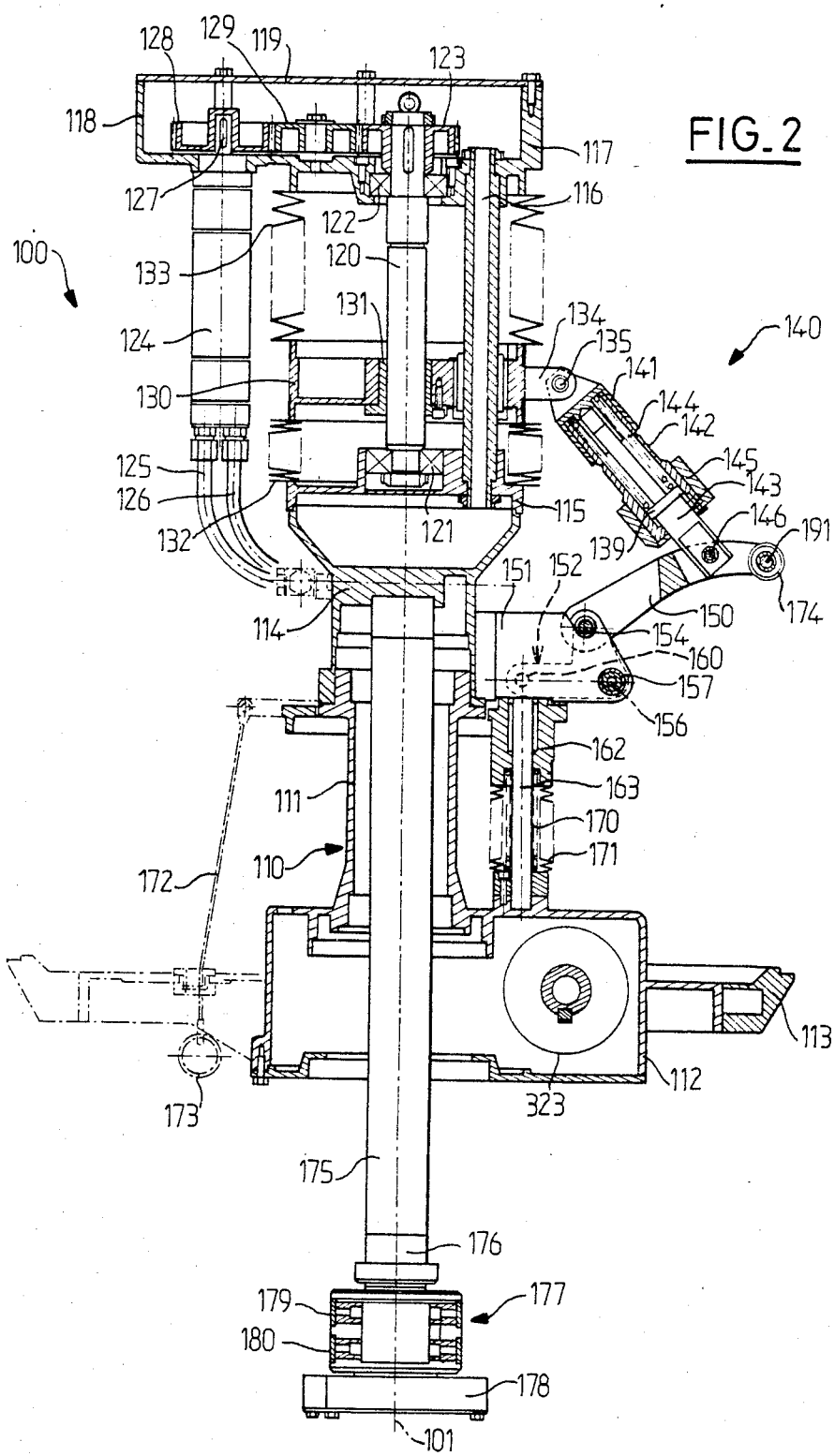
FIG. 2 shows in an identical view of the structure of the fixed frame of the support apparatus together with associated jaws and claws in accordance with the present invention.

Reference to FIG. 2 also indicates a mobile plate 130. This plate is perpendicular to the axis 101. It is guided for movement in translation parallel to the axis 101 on the columns 116.

The mobile plate 130 has a central bore in it fitted with a nut 131 meshing with the screw 120.

To protect the cooperating screw 120 and nut 131 the mobile plate 130 is joined to the flange plates 115 and 117 by respective bellows 132, 133.

The man skilled in the art will readily understand that operation of the pneumatic motor 124 in alternate directions secures to-and-fro movement of the mobile plate 130 in translation parallel to the axis 101.

The mobile plate 130 is provided on its external surface with a plurality of yokes 134 equi-angularly distributed about the axis 101.

These yokes 134 support pivoting spring links 140 through the intermediary of journals 135. The axis of each journal 135 is perpendicular to a respective radius passing through the axis 101.

The spring links 140 are also articulated to claws 150 through the intermediary of journals 146. At each spring link 140 the axis of the journal 146 is parallel to the axis of the journal 135.

To be more precise, each spring link 140 comprises an internally threaded sleeve 141, a spring cage 142, a plunger 143, a spring 144 and a detector support 145.

Each sleeve 141 is pivotally supported by a journal 135 on a yoke 134. It receives a generally cylindrical spring cage 142 concentric with it. The spring cage 142 is open at the end opposite the sleeve 141. However, the cross-section of the opening in the spring cage 142 is less than the internal cross-section of the chamber delimited by this cage.

Also, each plunger 143 is articulated by a journal 146 to a claw 150. The plunger 143 is essentially formed by a rod coaxial with the sleeve 141 and with the spring cage 142. For the most part, the plunger 143 is inside the spring cage 142, but it emerges from the cage through the opening provided in the latter. Each plunger 143 is provided, inside the spring cage 142, with an annular rib 139. The cross-section of the rib 139 is greater than the cross-section of the opening in the spring cage 142. In this way the rib 139 prevents complete extraction of the plunger 143 from the spring cage 142. The spring 144 is inserted between the base of the sleeve 141 articulated to the yoke 134 and the rib 139 of the plunger 143. The spring 144 therefore urges the plunger 143 towards the outside of the spring cage 142 and, by compressing, enables displacement of the plunger 143 towards the inside of the cage 142.

The support 145 fixed to the external periphery of the cage 142 carries a detector 190 cooperating with a peg placed on the rib 139 or near it to monitor displacement of the plunger 143 relative to the spring cage 142.

The spacer 114 inserted between the barrel 111 and the flange plate 115 carries a plurality of plates 151 the number of which is equal to the number of spring links 140 and claws 150. The plates 151 extend radially relative to the axis 101. Each claw 150 is articulated to a pair of levers 152, 153 through the intermediary of a journal 154. The axis 155 of each of these journals is parallel to the axis of each of the associated journals 134 and 146.

The levers 152, 153 are in the form of flat plates the contour of which is generally L-shaped. Each pair of levers 152, 153 is articulated to one of the associated plates 151 to pivot about an axis 156 physically manifested in journals 157. The axis 156 is parallel to the axis of each of the journals 154, 146 and 134.

In the normal operating position, the axis 155 is situated radially inside the axis 156 relative to the axis A—A of the orifice.

In the normal operating position, the smaller branch of the L-shape of the levers 152, 153 extends towards the front, parallel to the axis 101. The larger branch of the L-shape of the levers 152, 153 extends towards the axis 101 in a substantially radial direction.

The journal 154 defining the articulation between the claw 150 and the levers 152, 153 is at the end of the smaller branch of the L-shape of the levers 152, 153. The journals 157 defining the articulation of the levers 152, 153 to the plate 151 are provided in the area where the two branches of the L-shape of the levers 152, 153 merge.

Figures 8, 9:
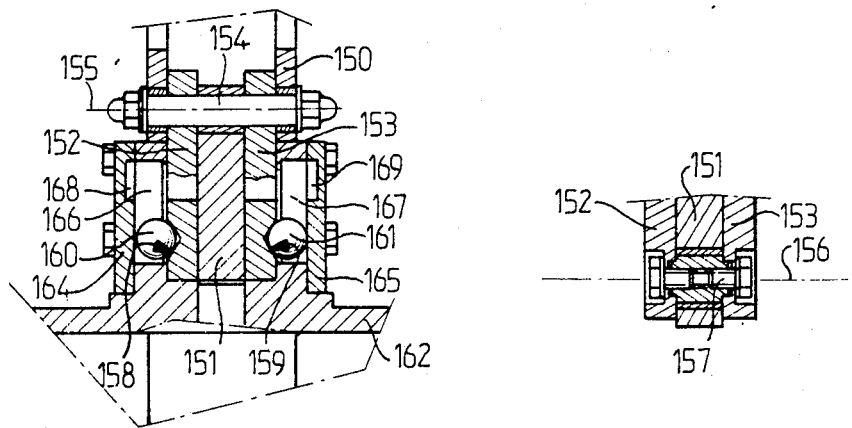
FIG. 8 shows a detailed view of means associated with the claws on non-coplanar cross-section planes denoted VIII—VIII in FIG. 1.
FIG. 9 shows another detail view of the fixed frame of the support apparatus on a cross-section plane denoted IX—IX in FIG. 1.

Also, as is clear from comparing FIGS. 2 and 8 in particular, there are provided at the end of the larger branch of the L-shaped levers 152, 153, on their external surface, frustoconical housings 158, 159. These housings receive balls 160, 161. The presence of a plate 162 will also be noted on referring to FIGS. 1 and 2. The generally ring-shaped plate 162 extends transversely to the axis 101, to the rear of the plates 151. It is guided for movement parallel to the axis 101 by columns 163. The columns 163 are parallel to the axis 101 and equi-angularly distributed about it. The columns 163 join the casing 112 to the plates 151.

As shown in FIG. 8, the plate 162 carries pairs of flange plates 164, 165 the number of which is equal to the number of spring links 140 and claws 150. The flange plates 164, 165 are parallel to each other and to the associated plates 151 and levers 152, 153. Together with the plate 162, they define oblong housings 166, 167 receiving the balls 160, 161. The oblong housings 166, 167 are parallel to the axis 101.

The depth of the housings 166, 167 in the direction parallel to the axis of the journals 154 and 157 is such that in the normal operating position the balls 160, 161, which rest against the back of the housings 166, 167, at their rear end, are held in the frustoconical housings 158, 159 on the levers 152, 153.

Also, the flange plates 164, 165 are provided with cavities 168, 169 which open into the back of the housings 166, 167 at the front end thereof farthest away from the plate 162.

When the cavities 168, 169 are positioned facing the balls 160, 161 the balls can escape from the housings 158, 159 to enable free pivoting of the levers 152, 153 about the axis 156.

The plate 162 is pushed against the plates 151 by springs 170. The springs are fitted over the column 163 between the casing 112 and the plate 162. The springs 170 are protected by bellows 171.

A cable 172 is fixed to the plate 162. As shown in FIGS. 1 and 2, the cable 172 extends substantially parallel to the axis 101, towards the rear i.e. away from the casing 118. It passes through the casing 112 and has at its end a holding ring 173.

The combination comprising the levers 152, 153, the balls 160, 161 and the plate 162 constitutes an emergency retraction device for the claws 150. The functioning of this device will be described in more detail later.

The claws have a curved shape, with the concave side facing towards the centering jaws 113, that is to say towards the back.

The claws 150 are provided at their end with a roller 174 adapted to rest on the internal surface I of the wall P. Each journal 146 defining the articulation between a spring link 140 and a claw 150 is placed between the associated journal 154 and roller 174.

A hollow cylindrical shaft 175 centered on the axis 101 passes through the barrel 111. The hollow shaft 175 serves as a collector. Electrical connections associated with the detectors of the device and pneumatic hoses 125, 126 pass though it. The hollow shaft 175 emerges from the back of the casing 112, on the same side as the external surface E of the wall P. At this level the collector 175 supports at its end 176 a system of indicator lamps 177 and an electromagnetic connection plate 178.

The system of indicator lamps 177 is in the form of a generally cylindrical structure centered on the axis 101. The system of indicator lamps 177 carries two indicator lamps 179, 180 of annular ring shape centered on the axis 101. These indicator lamps 179, 180 are respectively green and red. The green indicator lamp 179 is on when the detectors 190 associated with the spring links 140 detect that all of the claws 150 are in the operative, extended position, in which the rollers 174 rest against the internal surface I of the wall P. In other words, the green indicator lamp 179 indicates that the support 100 is immobilized in the orifice O of the enclosure. On the other hand, the red annular indicator lamp 180 is on at all times when the detectors 190 do not detect all of the claws 150 in the operative, extended position.

Because of the annular shape of the indicator lamps, an operator can easily check the status of the support apparatus 100.

The detectors 190 supported by the members referenced 145 may be electrically connected to a processor circuit board housed in the casing 118, this board being itself connected to the indicator lamps 179, 180 by connections passing through the collector 175.

Also seen in FIG. 4 are a pair of handles 181, 182 attached to the casing 112 and designed to facilitate handling of the device.

In its essentials, the functioning of the fixed frame 100 is as follows.

Initially, the mobile plate 130 being adjacent the flange plate 117, the claws 150 are placed in the idle, retracted position. They extend towards the front, substantially parallel to the axis 101. In this position the rollers 174 are circumscribed within an envelope the cross-section of which is less than the transverse cross-section of the orifice O. The fixed frame 100 can therefore be inserted into the orifice O. This insertion movement continues until the structure forming the centering jaws 113 comes into contact with the external surface E of the wall P. During this insertion into the orifice O, the frame is oriented relative to the axis of the orifice O by actuators 340 that will be described later. The operator then actives the pneumatic motor 124 to drive the screw 120 and move the mobile plate 130 towards the flange plate 115. Synchronously with this, the spring links 140 cause the claws 150 to pivot about the journals 154 towards the extended position shown in FIG. 1. In this position the rollers 174 rest against the internal surface I of the wall P. The fixed frame 100 is thus immobilized in the orifice O and automatically centered on the axis A—A.

The presence of the springs 144 in the spring links 140 prevents any damage to the fixed frame 100 or the wall P.

To withdraw the fixed frame 100 in the normal way, it suffices to operate the pneumatic motor 124 in the reverse direction to move the mobile plate 130 towards the flange plate 117. This withdraws the claws 150 into the idle, retracted position, pivoting them about the journals 154, through the intermediary of the spring links 140.

Also, and this is an important characteristic of the present invention, the fixed frame 100 is provided with means for rapidly withdrawing the claws 150 into the idle, retracted position even in the event of complete failure of the drive means for the mobile plate 130 and the spring links 140, in particular should the air supply fail. These emergency retraction means comprise the levers 152, 153, the balls 160, 161 and the plate 162.

The functioning of these means for securing emergency withdrawal of the fixed frame 100 will now be described.

The spring 144 integrated into each link 140 exerts on the journal 146 a clamping force $F_S$ (see FIG. 21) the direction of which is coincident with a generatrix passing through the axis of the journals 135, 146. Also, the roller 174 experiences a reaction force $F_A$ the direction of which coincides with a radius of the roller 174 passing through the point of contact of the roller with the internal surface I of the wall. Also, each claw 150 exerts on the journal 154 a force $F_B$. The vector sum of the forces $F_B$ and $F_A$ balances the clamping force $F_S$.

The levers 152, 153 which support the journal 154 thus exert a reaction force $-F_B$ on the journal 154. This force tends to pivot the levers 152, 153 about the axis 156 of the journal 157.

In other words, the force $-F_B$ tends to move the axis 155 of the journal 154 away from the axis of symmetry 101, that is to say it tends to pivot the levers 152, 153 shown in FIG. 2 in the clockwise direction about the axis 156.

However, in the normal operating position the springs 170 push the plate 162 provided with the flange plates 164, 165 into contact with the plates 151. The balls 160, 161 are therefore placed at the rear end of the oblong housings 166, 167, the opposite end to the cavities 168, 169. As previously indicated, the oblong housings 166, 167 are essentially parallel to the axis of symmetry 101. Consequently, the balls 160, 161 prevent the levers 152, 153 pivoting about the axis 156. Any such pivoting of the levers 152, 153 would require that the balls 160, 161 be capable of moving into an annular housing centered on the axis 156.

In the other hand, when an operator pulls on the ring 173 connected to the cable 172, the plate 162 is pulled back against the action of the springs 170, away from the plates 151.

This brings the cavities 168, 169 into line with the balls 160, 161. These can then escape from the frustoconical housings 158, 159 formed in the levers 152, 153 and enter the cavities 168, 169. In this position there is no member between the frustoconical housings 158, 159 provided in the levers 152, 153 and the oblong housings 166, 167 provided in the plate 162. The levers 152, 153 are therefore free to pivot about the axis 156 as a result of the previously mentioned force $-F_B$.

During this movement the spring links 140 pivot about the journal 135. The claws 150 are articulated to the spring links 140 about the journal 146 add to the levers 152, 153 about the journal 154. Thus the claws 150 execute a complex pivoting movement whereby they are moved into a position substantially parallel to the axis of symmetry 101. They are then circumscribed by an envelope the cross-section of which is less than the transverse cross-section of the orifice O.

Figure 21:
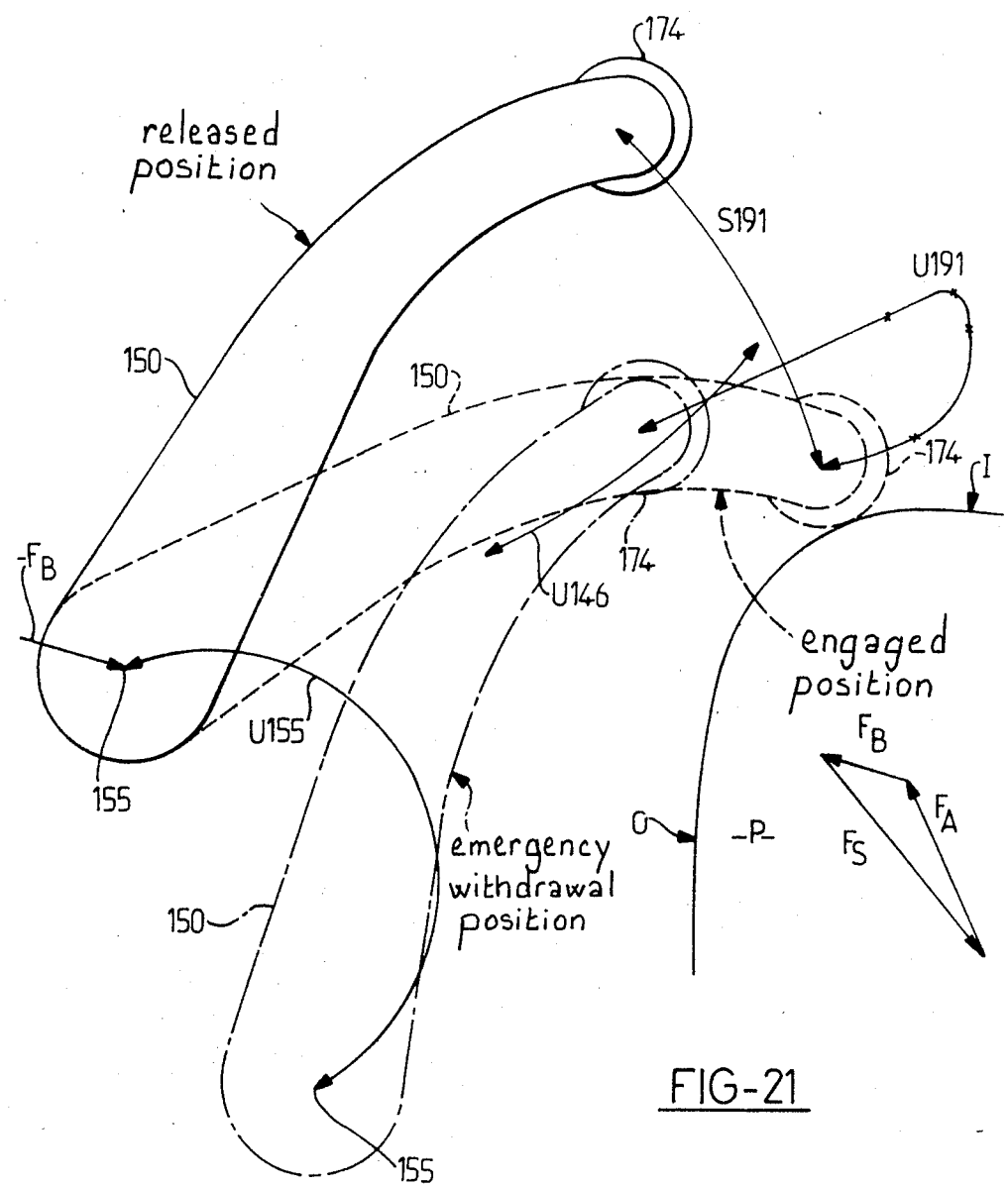
FIG. 21 is a diagram illustrating the movement of the claws carried by the fixed frame.

The functioning of the fast emergency retraction device that has just been described, initiated by pulling on the cable 172, is illustrated in the appended FIG. 21.

In this figure, the released position of a claw 150, when the mobile plate 130 is adjacent the flange plate 117, is shown in full outline. The engaged position of a claw 150, when the mobile plate 130 has been moved towards the flange 115 by a pneumatic motor 124, is shown in dashed outline. Finally, FIG. 21 shows in chain-dotted outline a claw 150 in the emergency withdrawal position, after the cable 172 has been pulled. FIG. 21 also shows the trajectory S191 of the axis of the roller 174 during the process of engaging the claws. This trajectory S191 is, of course, centered on the axis 155 of the journal 154. There is also shown the trajectory U155 of the axis 155 of the journal 154 during emergency withdrawal obtained by pulling on the cable 172. This trajectory U155 is, of course, centered on the axis 156. There is also shown the trajectory U146 of the axis of the journal 146 during the emergency withdrawal procedure. This trajectory U146 is centered on the axis of the journal 135. Finally, there is also shown the trajectory U191 of the axis of the roller 174 during the emergency withdrawal procedure.

If necessary, an additional spring may be inserted between the plate 151 and the levers 152, 153 to facilitate pivoting of the levers and therefore of the claws 150 about the axis 156 during the emergency withdrawal procedure initiated by pulling the cable 172.

MOBILE FRAME 300

The mobile frame 300 schematically represented in FIG. 3 is carried by the fixed frame 100 in such a way as to pivot about the axis of symmetry 101. Its essential function is to move the brushing device shown in FIGS. 11 through 21 into line with each of the threaded bores T to be brushed in turn.

The mobile frame 300 comprises a sleeve 310 coaxial with the axis 101. The sleeve 310 is inserted between the base 110 and the collector 175.

The mobile frame 300 is driven stepwise about the axis 101 by a cam-based indexing device 320. This indexing device essentially comprises a ring 321 carrying a plurality of rollers 322 and a cam 323.

The ring 321 is fixed to the sleeve 310, substantially halfway along it.

The ring 321 is provided with a plurality of journals 324 equi-angularly distributed about the axis 101 and extending radially relative to it. Each of the journals 324 carries a roller 322. The rollers 322 mesh with the cam 323.

The axis of the latter extends perpendicularly to a radius through the axis of symmetry 101.

The cam 323 has an active surface transverse to its axis on which the rollers 322 roll in succession. This active surface is formed by a helical surface of variable pitch subtending an angle of 270° and a plane surface normal to the axis of the cam 323 which subtends an angle of 90°.

A conical toothed wheel 326 is fastened to the shaft of the cam 323. It meshes with a conical drive toothed wheel 325. The drive toothed wheel 325 is connected to the output shaft of a pneumatic motor 394.

The man skilled in the art will readily understand that sequential operation of this pneumatic motor 394 enables the mobile frame 300 to be rotated stepwise about the axis of symmetry 101.

The steps by which the mobile frame 300 is displaced are delimited by the roller 322 coming onto the plane sector of the cam 323. The presence of this plane sector therefore makes it possible to obtain precise indexing of the mobile frame 300 without it being necessary to control precisely the moment at which the pneumatic motor 394 is stopped.

It will be noted that the ring 321, the journals 324 and the rollers 322, the cam 323, and the toothed wheels 325, 326 are housed inside the casing 112.

The mobile frame 300 further comprises a mobile arm 330. The mobile arm 330 is fastened to the sleeve 310. The arm 330 comprises a central barrel 331 fitted over the sleeve 310 and three branches 332, 333 and 334.

The branches 332, 333 and 334 are essentially radial relative to the axis 101. The branches 332, 333 are substantially diametrally opposed relative to the axis 101. The branch 334 is substantially orthogonal to the branches 332, 333.

The branch 334 is designed to support the brushing device shown in FIGS. 11 through 21.

The branches 332, 333 are provided with self-centering actuators designed to procure precise positioning of the mobile frame 300 carrying the brushing device relative to the threaded bores T.

Two self-centering actuators diametrally opposed relative to the axis 101 are therefore provided.

The structure of a self-centering actuator of this kind is shown in the righthand part of FIG. 3.

Each self-centering actuator 340 has an axis of symmetry 341 parallel to the axis 101.

Each self-centering actuator 340 is in fact formed by two actuators in a cascade arrangement so that a centering head 342 can be moved into three successive positions.

To this end, each actuator 350 essentially comprises three members 343, 344 and 345 coaxial with the axis 341 and nested one within the other.

The member 343 which constitutes the exterior body of the actuator is fixed to the end of one of the branches 332 or 333. The actuator body 343 defines a cylindrical internal chamber centered on the axis 341. This chamber receives the member 344 which can move in translation along the axis 341. It forms a primary piston. To this end, the member 344 is provided on its periphery with a rib which receives an O-ring seal 346. The seal 346 rests against the inside periphery of the actuator body 343. There are thus formed between the external periphery of the primary piston 344 and the internal surface of the actuator body 343, on respective sides of the seal 346, two working chambers 347, 348. Pressurizing the chambers 347, 348 serves to displace the primary piston 344 alternately in one direction and the other along the axis 341.

The primary piston 344 forms the body of a secondary actuator. To this end it delimits a generally cylindrical internal chamber which receives the member 345 which is movable in translation along the axis 341. The member 345 thus forms the secondary piston. It is provided at its periphery with a rib which receives an O-ring seal 349. The seal 349 rests against the internal surface of the body 344. There are thus formed between the external periphery of the secondary piston 345 and the internal surface of the body 344, on respective sides of the O-ring 349, two working chambers 350, 351. Successive pressurization of the chambers 350, 351 serves to displace the piston 345 alternately in one direction or the other along the axis 341.

The centering head 342 is fixed onto the front end of the secondary piston 345 emerging from the actuator 340. The head 342 is in the form of a stepped body of revolution about the axis 341. In its essentials, it comprises two portions 352, 353 of different diameter.

The larger diameter portion 353 is adjacent the secondary piston 345. It merges with the smaller diameter front portion 352 through a chamfer 354. The chamfer 354 converges towards the axis 341 in the direction away from the secondary piston 345. Finally, the free end of the portion 352 is formed with a chamfer 355. The chamfer 355 converges towards the axis 341 in the direction away from the secondary piston 345.

The purpose of the chamfers 355 and 354 is to facilitate insertion of the centering head 342 into a threaded bore T.

As seen on referring to FIG. 1, the larger diameter rear portion 353 of the centering head 342 has a transverse cross-section substantially complementary to the cross-section defined by the tops of the threads of the threaded bores T.

The working chambers 347, 348, 350 and 351 are supplied with compressed air through hoses carried by the arms 332, 333. These hoses are connected to pipes 356, 357, 358, and 359 fixed to the actuator bodies 343 (see FIG. 6). The pipes 356 through 359 are extended by passages formed in the actuator body 343. Two of these passages discharge radially directly into the working chambers 347, 348 to drive the primary actuator consisting of the actuator body 343 and the primary piston 344.

On the other hand, the other two passages formed in the actuator body 343 comprise (see FIG. 7) a blind first section 360 generally radial relative to the axis 341 which discharges into a blind longitudinal second section 361 opening into the rear of the actuator body 343, that is to say the end opposite the centering head 342. This second section 361 receives, in a fluid-tight way, a sliding tube 362 carried by a ring 363 fastened to the rear end of the primary piston 344. The tube 362 communicates with a transverse passage 364 formed in the ring 363. Each of the transverse passages 364 communicates with a longitudinal passage 365 formed in the body 344 parallel to the axis 341. Finally, the longitudinal passages 365 discharge into respective working chambers 350, 351 to command to-and-fro movement of the second piston 345 in translation along the axis 341.

Three sensors 366, 367, 368 spaced longitudinally parallel to the axis 341 and associated with a peg 369 carried by a rod 370 attached to the centering head 342 serve to monitor displacement of the latter parallel to the axis 341.

The arm 344 carries a structure adapted to receive the brushing device shown in FIGS. 11 through 21.

The support apparatus essentially comprises a cylindrical hollow shaft 380 centered on an axis 381 parallel to the axis 101.

A sleeve 382 is fixed to the front of the sleeve 380, that is to say towards the external surface E of the wall P. The sleeve 382 is centered on the axis 381. Its free end is fitted with a lip seal 383. The seal 383 serves to seal the space delimited by the hollow shaft 380, the sleeve 382 and the external surface E of the wall P to the periphery of a threaded bore T to be brushed.

The rear end of the hollow shaft 380 is fitted with an annular flange 384 centered on the axis 381, as shown in FIG. 3. The flange 384 serves as a support for the brushing device. It is surrounded by a clamping ring 385 adapted to rotate about the axis 381. Rotation of the clamping ring 385 about the axis 381 is commanded by a handle 386.

The clamping ring 385 is provided to the rear of the flange 384 with a plurality of projections 387 in the shape of sectors of a ring directed towards the axis 381. The projections 387 each cover a limited angular sector complementary to that defined by similar projections 790, 791, 792 on the outside periphery of the casing of the brushing device. The man skilled in the art will readily understand that this arrangement makes it possible to fix the casing of the brushing device onto the flange 384 using the clamping rings 385 in the manner of a bayonet coupling. The casing of the brushing device is immobilized in the hollow shaft 380, on the flange 384, immediately the projections 387 provided on the clamping ring 385 cover the similar projections 790, 791, 792 provided on the casing of the brushing device.

The flange 384 carries an annular gasket 388.

The space inside the sleeve 382 and the hollow shaft 380 communicates through the intermediary of a sealed chamber 389 formed in the arm 334 with a pipe 390 adapted to be connected to suction means. This arrangement makes it possible to suck up efficiently all material brushed out from a threaded bore. The pipe 390 may advantageously be fixed to the arm 334 by a bayonet type coupling. This arrangement, conventional in itself, will not be described in any more detail here.

The mobile frame 300 functions in the following way.

When the fixed frame 100 is inserted into the orifice O, with the claws 150 in the retracted position, the primary and secondary pistons 344, 345 are in the extended position.

The operator guides the fixed frame 100 so as to insert the two centering heads 342 into diametrally opposed threaded bores T. At the same time, the jaws 113 are brought into contact with the external surface E. The claws 150 are then deployed against the internal surface I to fix the frame in position.

In this way precise positioning of the fixed frame 100 and the mobile frame 300 is obtained, with them centered on the axis of the orifice O.

In this position the axis 381 of the hollow shaft 380 coincides precisely with the axis of a threaded bore T to be brushed. The brushing device supported by the hollow shaft 380 may then proceed to brush this bore. When the brushing operation is finished the brush is withdrawn from the previously mentioned threaded bore. Likewise, the pistons 344 and 345 are retracted. The mobile frame 300 is then rotated about the axis 101, by the cam 323, through an angular increment corresponding to the predefined angular offset between two threaded bores T. The pistons 344 and 345 are then extended again to control alignment of the axis 381 of the hollow shaft 380 with the axis of the next threaded bore. A further brushing operation is then carried out.

The angular increment through which the mobile frame 300 is rotated about the axis 101 may be controlled by means of a detector 391 carried by the casing 323. The detector 391 is responsive to the passage of an eccentric peg 392 carried by the shaft of the cam 323. There are easily seen in FIG. 4 the detectors 190 carried by the supports 145 and intended to detect the deployment of the claws 150 into the engaged position and to respond thereto by turning on the green indicator lamps 179. There is also seen in FIG. 5 a journal 191 supporting a roller 174 on one of the claws 150.

Figure 10:
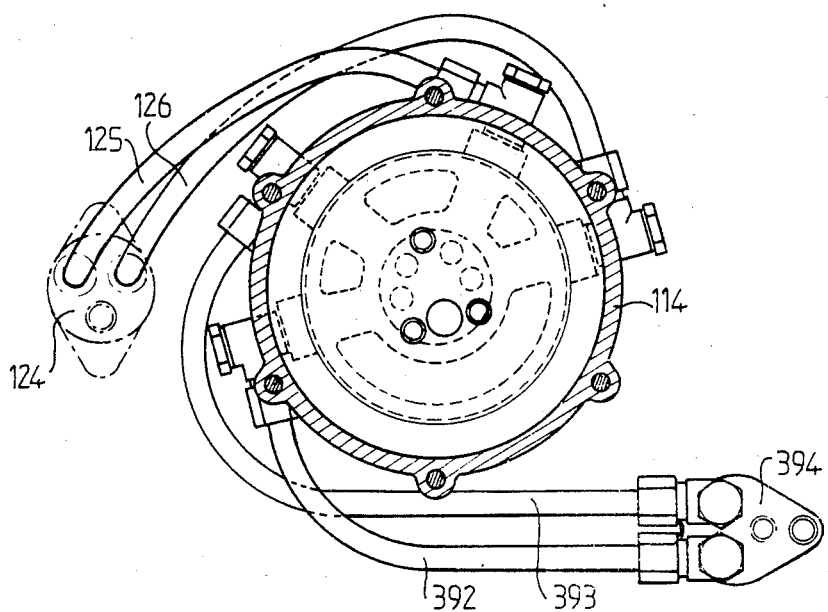
FIG. 10 shows another view of the fixed frame of the support apparatus in transverse cross-section on the cross-section plane denoted X—X in FIG. 1.
Figure 11:
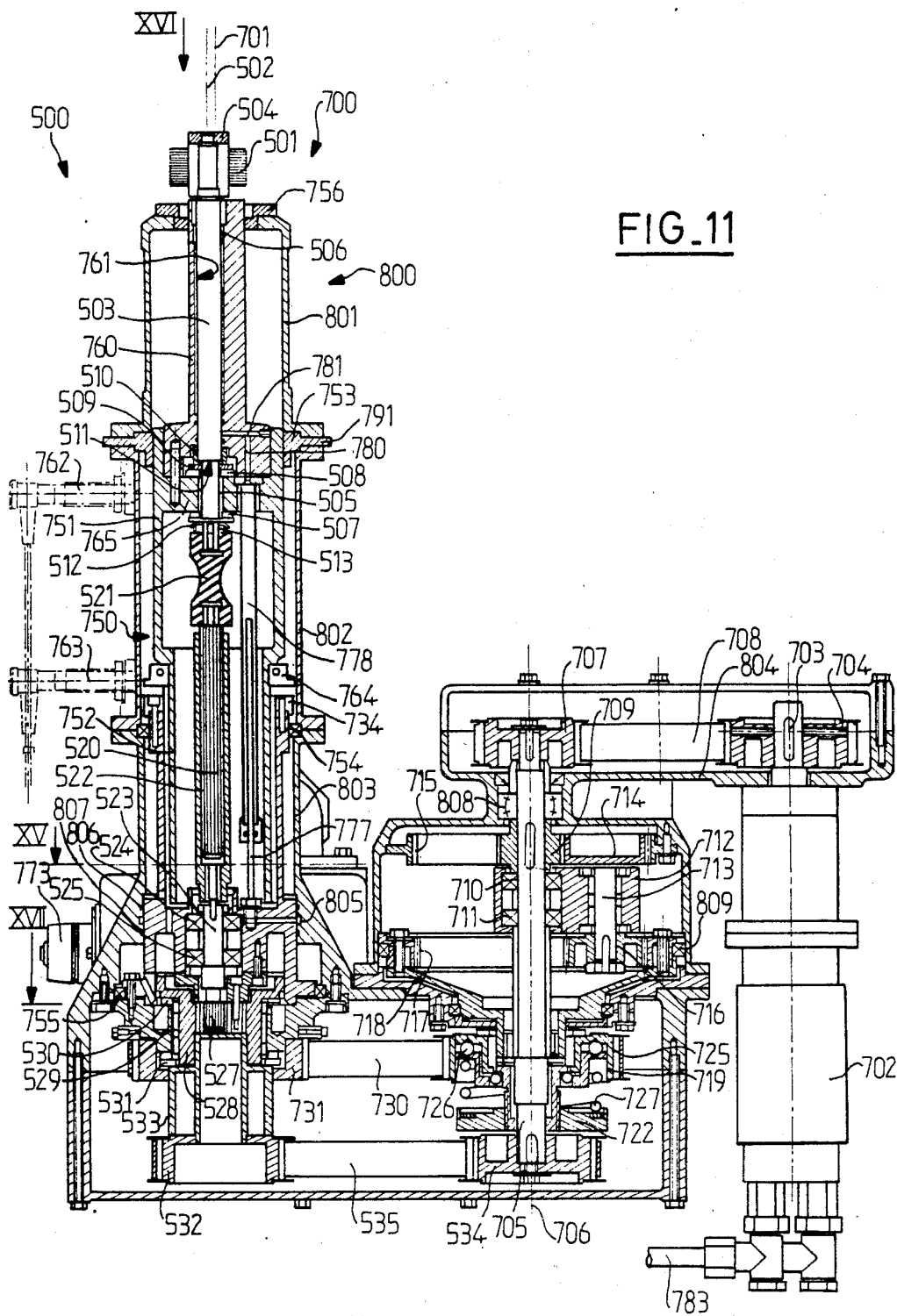
FIG. 11 shows a general schematic view of the brushing device proper in longitudinal cross-section on non-coplanar cross-section planes denoted XI in FIG. 16.

There are seen in FIG. 10 the pipes 392, 393 feeding the pneumatic motor 394 whose output shaft carries the drive toothed wheels 325. Like the pipes 125, 126, the pipes 392, 393 extend inside the collector 175 to terminate at the connection plate 178.

The structure of the brushing device proper shown in FIGS. 11 through 21 will now be described.

Figure 12:
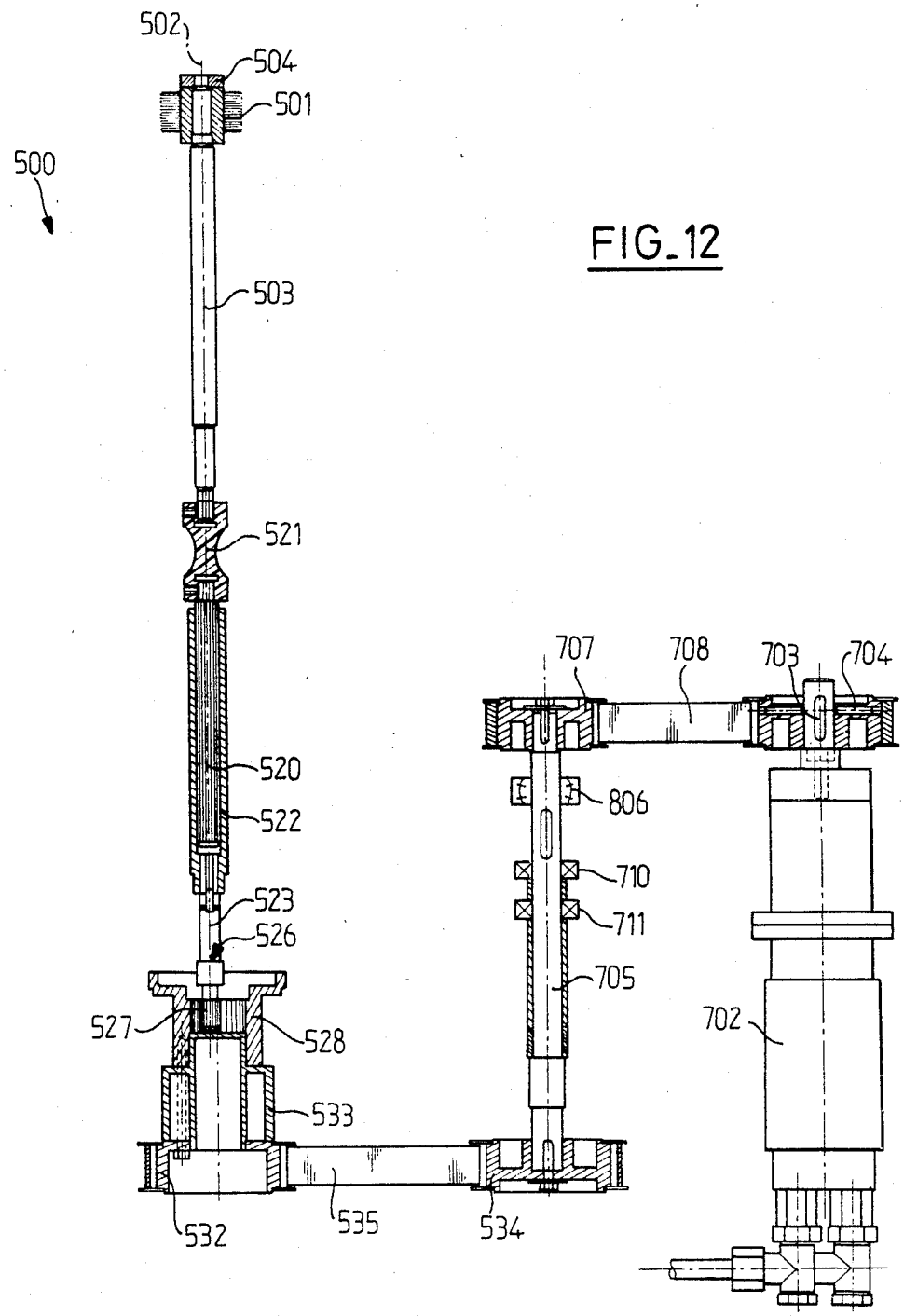
FIG. 12 shows in an identical view the assembly driven in rotation about the main axis and equipped with the brush.

As previously indicated, the brushing device essentially comprises an assembly 500 shown in FIG. 12 provided with a brush 501 and driven in rotation about a main axis 502 parallel to the axis of the threaded bore T and auxiliary drive means 700 shown in FIG. 13 adapted to displace the assembly 500 at the same time with a helical motion centered on the axis of the bore T.

The assembly 500 and the auxiliary drive means 700 are housed in a casing 800. The structure of this casing 800, which can be implemented in numerous ways, will not be described in detail here.

It will be noted, however, that the casing 800 comprises a plurality of sleeves 801, 802, 803 coaxial with each other and fastened together, centered on the axis 701 of the auxiliary drive means 700. The casing 800 further comprises a member referenced 804 in FIG. 11.

AUXILIARY DRIVE MEANS 700

The auxiliary drive means 700 comprise a pneumatic drive motor 702 the output shaft 703 of which is parallel to the axis 101. The output shaft 703 carries a pulley wheel 704.

The casing member 804 supports an intermediate shaft 705 which rotates about an axis 706. The axis 706 is parallel to the axis 701. The intermediate shaft 705 is supported by a bearing 808.

The forward end of the intermediate shaft carries a pulley wheel 707. The pulley wheel 707 is in line with the pulley wheel 704 and a belt 708 links the two pulley wheels 704, 707.

A drive toothed wheel 709 is keyed to the intermediate shaft 705. The intermediate shaft carries a pair of bearings 710, 711. A planet wheel support member 712 is mounted to rotate about the axis 706 on the shaft 705 through the intermediary of the bearings 710, 711. The member 712 receives a journal 713 which rotates about an axis parallel to the axis 706.

The journal 713 carries at its forward end a driven toothed planet wheel 714. The toothed wheel 714 meshes with the drive toothed wheel 709. It also meshes with a toothed ring 715 carried by the casing member 804.

The journal 713 carries at its rear end a driving toothed planet wheel 716. The toothed wheel 716 meshes with a secondary toothed ring 717. This is carried by an intermediary bearing 718. The intermediate bearing 718 is guided in rotation by a bearing 809 guided in rotation about the shaft 705. The intermediate bearing 718 is connected to a pulley wheel 719 by a clutch and torque limiter system 720.

To this end the intermediate bearing 718 comprises a tubular extension 721 surrounding the intermediate shaft 705 and freely rotatable relative to it.

The end of the tubular extension 721 carries a nut 722. The nut 722 is screwed onto the tubular extension 721; it is therefore attached to it for movement in translation and for rotation.

Also, the tubular extension 721 carries a drive plate 723.

The drive plate 73 is constrained to rotate with the tubular extension 721 by balls 724. On the other hand, it is able to move relative to the tubular extension 721 in axial translation parallel to the axis 706.

The drive plate 723 is adjacent one flange 725 of the pulley wheel 719. Balls 726 are placed between the drive plate 723 and the flange 725. Also, a spring 727 is disposed between the nut 722 and the drive plate 723.

In normal operation, when no significant resisting torque is exerted on the pulley wheel 719, the spring 727 which pushes the drive plate 723 towards the flange 725 enables driving of the pulley wheel 719 through the intermediary of the balls 726.

On the other hand, if a significant resisting torque is exerted on the pulley wheel 719, it remains immobile and the balls 726 permit relative rotation between the drive plate 723 and the pulley flange 725.

A belt 730 meshes with the pulley wheel 719. The belt 730 also meshes with a pulley wheel 731.

This pulley wheel 731 is centered on the axis 701 of the auxiliary drive means 700. It will be noted that the sleeves 801, 802 and 803 of the casing 800 are also centered on this axis 701.

The pulley wheel 731 is fixed to the back of a hub 732 also centered on the axis 701. Likewise, the hub 732 is fixed to the rear end of an intermediate shaft 733 centered on the axis 701. The pulley 731, the shaft 732 and the intermediate shaft 733 are coupled to rotate together about the axis 701.

The forward end of the intermediate shaft 733 is fitted with a splined hub 734 centered on the axis 701. The hub 734 has on its inside periphery a plurality of longitudinal splines parallel to the axis 701 and which cooperate with a main screw 750.

The screw 750 is essentially parallel to the axis 701.

To be more precise, it has a forward section 751 provided with a screwthread on its outside periphery and a rear section 752 provided with longitudinal splines on its outside periphery.

The longitudinal splines formed on the outside periphery of the section 752, which are parallel to the axis 701, mesh with the splined hub 734. Thus the screw 750 and the splined hub 734 are coupled to rotate together about the axis 701. On the other hand, the screw 751 can move relative to the splined hub 734 in translation parallel to the axis 701.

The threaded section 751 of the screw 750 meshes with a nut 753 centered on the axis 701 and immobilized on the casing 800 between the casing members 801 and 802.

The splined hub 734, the intermediate shaft 733, the hub 732 and the pulley wheel 731 are guided to rotate in the casing 800 about the axis 701 by bearings 754 and 755, while being immobilized against movement in translation within the casing 800.

On the other hand, the screw 750 can move parallel to the axis 701 within the casing 800. It is guided by the cooperation between the splines 752 and the splined hub 734 and the inter-engaged screwthread 751 and nut 753. Moreover, the forward end of the screw 750 is guided by a bearing 756 carried by the casing 800.

Thus the man skilled in the art will readily understand that driving the pulley wheel 731 in rotation serves to rotate the splined hub 734 and therefore, by virtue of cooperation between the screwthread 751 and the nut 753, to drive the screw 750 with a helical motion centered on the axis 701. The displacement increment for the screw 750 corresponds to the pitch of the screwthread 751.

The intermediate shaft 733 and the screw 750 comprise internal bores 758, 759 centered on a common axis that is eccentric to the axis 701 and coincident with the axis 502 of the brush.

To be more precise, in the embodiment shown in FIGS. 11 through 21, the screw 750 is extended in the forward direction, that is to say away from the pulley wheel 731, by a generally cylindrical barrel 760.

The external envelope of the barrel 760 is centered on the axis 701. The barrel 760 comprises a cylindrical passage 761 centered on the axis 502 of the brush and extending the aforementioned bore 759.

The helical displacement of the screw 750 centered on the axis 701 is controlled by two detectors 762, 763 and an annular cam 764.

The sensors 762, 763 are supported by the casing member 802. They are spaced parallel to the axis 701. The annular cam 764 is supported by tee screw 751 between the threaded section 751 and the longitudinally splined section 752.

BRUSHING ASSEMBLY 500

This assembly 500 comprises a shaft 503 centered on the axis 502 and carries at its end the brush 501. The brush 501 is fixed to the shaft 503 by means of a nut 504. It will be noted on referring to the appended FIGS. 11 and 12 that the bristles of the brush 501 extend radially relative to the axis 502.

As previously indicated, in use the axis 502 is parallel to the axis of the threaded bore T to be brushed.

The shaft 503 is guided in rotation about the axis 502 in housings 761 and 759 formed in the barrel 760 and the screw 750.

The shaft 503 is guided in rotation about the shaft 502 by two needle roller bearings 505, 506 placed at respective ends of the shaft 503, one supported in the bore 759, the other in the bore 761. Also, the shaft 753 is immobilized against movement in translation on the screw 750 by a pair of needle roller thrust bearings 507, 508 placed on respective sides of an annular plate 765 transverse to the axis 701 and attached to the screw 750.

The front thrust bearing 508 rests against a washer 509. The washer 509 rests against a spacer 510 and the washer 510 rests against a ring-shaped recess 511 formed on the shaft 503 and facing towards the back of the brushing device, that is to say away from the brush 501. Also, the thrust bearing 507 rests against a washer 512 immobilized on the rear end of the shaft 503 by means of a nut 513.

The shaft 503 is extended towards the rear by a splined shaft 520. The splined shaft 520 is centered on the axis 502. The shafts 503 and 520 are linked together by a spring coupling 521.

The splined shaft 520 is inserted into a complementary splined sleeve 522. The sleeve 522 is centered on the axis 502.

Thus the splined shaft 520 and the splined sleeve 522 are coupled to rotate together about the axis 502 but free to move relative to each other in translation parallel to the axis 502.

The splined sleeve is extended towards the rear by a journal 523. The journal 523 is centered on the axis 502. It is linked in rotation and in translation to the sleeve 522. The journal 523 and thus the splined sleeve 522 are guided in rotation about the axis 502 on the immediate shaft 733 by means of a pair of ball bearings 524, 525.

The bearings 524, 525 are housed in the aforementioned bore 758. The bearing 524 rests against a washer immobilized on the journal 523 by means of a nut. The rear bearing 525 rests against a ring-shaped recess 526 formed on the journal 523 and facing towards the front, towards the brush 501.

The rear end 527 of the journal 523 is provided with longitudinal splines parallel to the axis 502. These splines mesh with complementary splines formed on the internal bore of a toothed wheel 535. The toothed wheel 535 is centered on the axis 502. It is coupled to the journal 523 to rotate with it but free to move axially relative to the journal. The toothed wheel 535, which has straight external teeth, meshes with a toothed ring 528. The toothed ring 528 is provided with longitudinal splines parallel to and centered on the axis 701.

The toothed ring 528 is guided in rotation about the axis 701 on the hub 732 by means of a needle roller bearing 529.

Also, the toothed ring 528 is immobilized against movement in translation along the axis 701 on the hub 732 by means of a pair of needle roller thrust bearings 530, 531.

The toothed ring 528 is attached to a pulley wheel 532. To be more precise, a spacer 533 is inserted between the toothed ring 528 and the pulley wheel 532. The toothed ring 528, the pulley wheel 532 and the spacer 533 are symmetrical bodies of revolution about the axis 701. They are coupled in rotation and in translation.

There is further provided a pulley wheel 534 attached to the rear end of the shaft 705. The pulley wheel 534 is disposed to the rear of the nut 722 serving as a support for the spring 727.

A belt 535 links the pulley wheels 532 and 534.

When the pneumatic motor 702 is operated, the rotational movement is transmitted to the pulley wheel 704, to the belt 708, to the pulley wheel 707, to the shaft 705, to the pulley wheel 534, to the belt 535, to the pulley wheel 523 and from there to the spacer 533 and to the toothed ring 528.

Thus the toothed ring 528 is driven in rotation about the axis 702.

Simultaneously with this, the rotational movement of the shaft 705 is transmitted, through the intermediary of the toothed wheel 709, the toothed wheel 714, the toothed wheel 716 and the ring 717, to the nut 722, to the plate 723, through the intermediary of the balls 726 to the pulley wheel 719 and from there to the belt 730, to the pulley wheel 731 and thus to the hub 732, to the intermediate shaft 733, to the splined hub 734 and thus to the screw 750.

The intermediate shaft 733 and the screw 750 are therefore driven simultaneously in rotation about the axis 701.

However, because of the presence of the epicyclic gear train 713, 714, 716 in the drive system to the intermediate shaft 733, this shaft and the screw 750 which is linked to rotate with it rotates about the axis 701 at a speed lower than the rotation speed of the toothed ring 528.

During the rotation of the intermediate shaft 733 and the screw 750 about the axis 701, the axis of the bores 758, 759 and 761 describes one revolution about the axis 701 whose radius corresponds to the defined eccentricity between the axes 701 and 502. As a result, the shaft 503, the splined sleeve 522 and the journal 523, the axis 502 of which coincides with the axis of the housings 758, 759 and 761 also perform a revolution about the axis 701. During this revolution of the axis 502 about the axis 701 the toothed wheel 535 remains in mesh at all times with the toothed ring 528 so as to drive the brush 501 in rotation at high speed about the axis 502. Moreover, as previously indicated, the rotation of the intermediate shaft 733 about the axis 701, which is communicated to the screw 750 meshed with the nut 753, drives the screw 750 in a helical motion centered on the axis 701. This helical motion is transmitted to the shaft 503 which carries the brush 501. The shaft 503 is immobilized in translation on the screw 750 by the thrust bearings 507, 508.

To summarize, when the motor 702 is put into operation a helical movement centered on the axis 701 is imparted to the screw 750. This movement is transmitted to the brush 501 guided in rotation about the axis 502 parallel to the axis 701. At the same time, the brush 501 is driven at high speed about its axis 502. The pitch of the nut 753 meshing with the threaded section 751 of the screw 750 preferably corresponds to the pitch of the thread in the bore T to be brushed. In this way the brush 501 performs a helical movement which follows the threads in the bore T.

To facilitate the removal of dust brushed out and to be sucked up through the intermediary of the pipe 390, air is preferably blown in along the axis of the brush 501. The compressed air supply necessary to achieve this is provided through the intermediary of a collector pipe 770 provided with a connector 771. A pipe 772 connected to the connector 771 passes through the collector 770 and terminates at a flowrate adjuster 773.

A pipe 774 runs from the flowrate adjuster 773 to a pipe 775 supported by the casing member 803. The pipe 775 discharges into an annular groove 805 centered on the axis 701 formed on the inside periphery of the casing member 803. The annular groove 805 is adjacent the periphery of the intermediate shaft 733. The casing member 303 further carries two O-ring seals 806, 807 on respective sides of the annular groove 805 and resting against the outside periphery of the intermediate shaft 733. The intermediate shaft 733 is provided with a blind passage 776 extending radially relative to the axis 701. The passage 776 discharges into the groove 805. The passage 776 is extended by a tube 777 parallel to the axis 701, towards the front of the brushing device, that is to say towards the brush 701. The tube 777 is carried by the intermediate shaft 733. It is coupled to the latter to rotate with it.

The tube 777 is inserted telescope-fashion into a sliding tube 778 carried by the annular plate 765 of the screw 750. A sealed joint 779 is provided between the two tubes 777, 778. The sliding tube 778 extends towards the rear parallel to the axis 701. It is extended towards the front by a passage 780 formed in the barrel 760. The passage 780 communications with a passage 781 formed in the barrel 760. The passage 781 extends radially relative to the axis 502. It discharges into an annular groove formed on the inside periphery of the barrel 760 inside the housing 761. This annular groove is adjacent the outside periphery of the shaft 503.

The barrel 760 carries two O-ring seals on respective sides of the aforementioned annular groove. These O-ring seals rest against the periphery of the shaft 503.

Also, the shaft 503 is provided with a longitudinal central passage which discharges at its forward end adjacent the brush 501, through the nut 504, and in the vicinity of its rear end into a radial conduit which itself discharges into the annular groove formed in the barrel 760 and communicating with the passage 781.

Thus compressed air fed into the passage 772 through the connector 771, after passing through the flowrate adjuster 773, is guided by the passage 774, the tube 775, the groove 805, the passage 776, the tube 777, the tube 778, the passage 780 and the passage 781, the annular groove formed in the barrel 760 and the passages formed in the shaft 503.

Cooperation between the groove 805 and the radial passage 776 ensures that the tube 777 is fed irrespective of the rotational position of the intermediate shaft 733. The telescopic cooperation of the tubes 777, 778 ensures that the tube 778 is fed irrespective of the relative position along the axis 701 of the intermediate shaft 733 and the screw 750.

Finally, cooperation between the annular groove formed in the barrel 760 and the radial passage formed in the shaft 503 ensures that the latter is fed irrespective of the rotational position of the brush 501 about the axis 502.

The passages 782, 783 feeding the pneumatic motor 702 are easily seen in the appended figures. These passages 782, 783 housed in the collector 770 terminate at the connector 771.

Provision is also made for lubricating the bearings of the device. The lubrication circuit comprises an oil pump 900 schematically represented in FIG. 17 and which essentially comprises the toothed wheel 535 mounted on the journal 523 and engaged with the toothed ring 528. The oil pump further comprises a crescent 901 housed without clearance in the space inside the toothed ring 528. The crescent extends parallel to the axis 701. Its axis of symmetry is diametrically opposite the axis 502 of the brushing assembly relative to the axis 701. The crescent 901 is fixed to the rear of the intermediate shaft 733 so as to be rotationally coupled to it.

The intermediate shaft 733 further defines two passages which discharge on respective sides of the crescent 901.

In a way that is conventional in itself, these two passages respectively serve as input and output to the oil pump system 900, the oil being circulated by virtue of rotation of the toothed wheel 535 within the toothed ring 528.

The outlet passage of the oil pump 900 communicates with a longitudinal passage 902 formed in the intermediate shaft 733. The passage 902 discharges into a tube 903. The tube 903 extends parallel to the axis 701 towards the brush 501. It is carried by the intermediate shaft 733 and rotationally coupled to it.

The tube 903 is inserted telescope-fashion into a tube 904. The tube 904 is carried by the annular plate 765 of the screw 750. It extends parallel to the axis 701 away from the brush 501. A sealed joint 905 is defined between the tubes 903 and 904.

The tube 904 discharges through the intermediary of a passage 906 formed in the barrel 760 into the chamber 761, that is to say on the periphery of the shaft 503.

Return of the oil towards the oil pump 900 is procured by a longitudinal passage 907 formed in the barrel 760 parallel to the axis 701.

The inlet of the passage 907 discharges into the chamber 761 in front of the bush 506. The outlet of the longitudinal passage 907 discharges axially into the back of the chamber 761 to lubricate the thrust bearings 507, 508 and the bush 505 together with the bearings 524, 525, and also radially onto the outside of the barrel 760 in front of the nut 753 to lubricate the coupling between the nut 753 and the screw 751, the bearing 754 and the splined hub 734.

Moreover, the outlet from the oil pump 900 discharges behind the bearing 525 into a set of radial and axial passages formed in the journal 523. The inlet of this set of passages discharges between the splined channel 522 and the splined shaft 520 to lubricate the coupling between these.

When the brushing device shown in FIGS. 11 through 21 is fitted onto the mobile frame 300, the most forward member 801 of the casing 800 is inserted into the sleeve 380.

Figure 16:
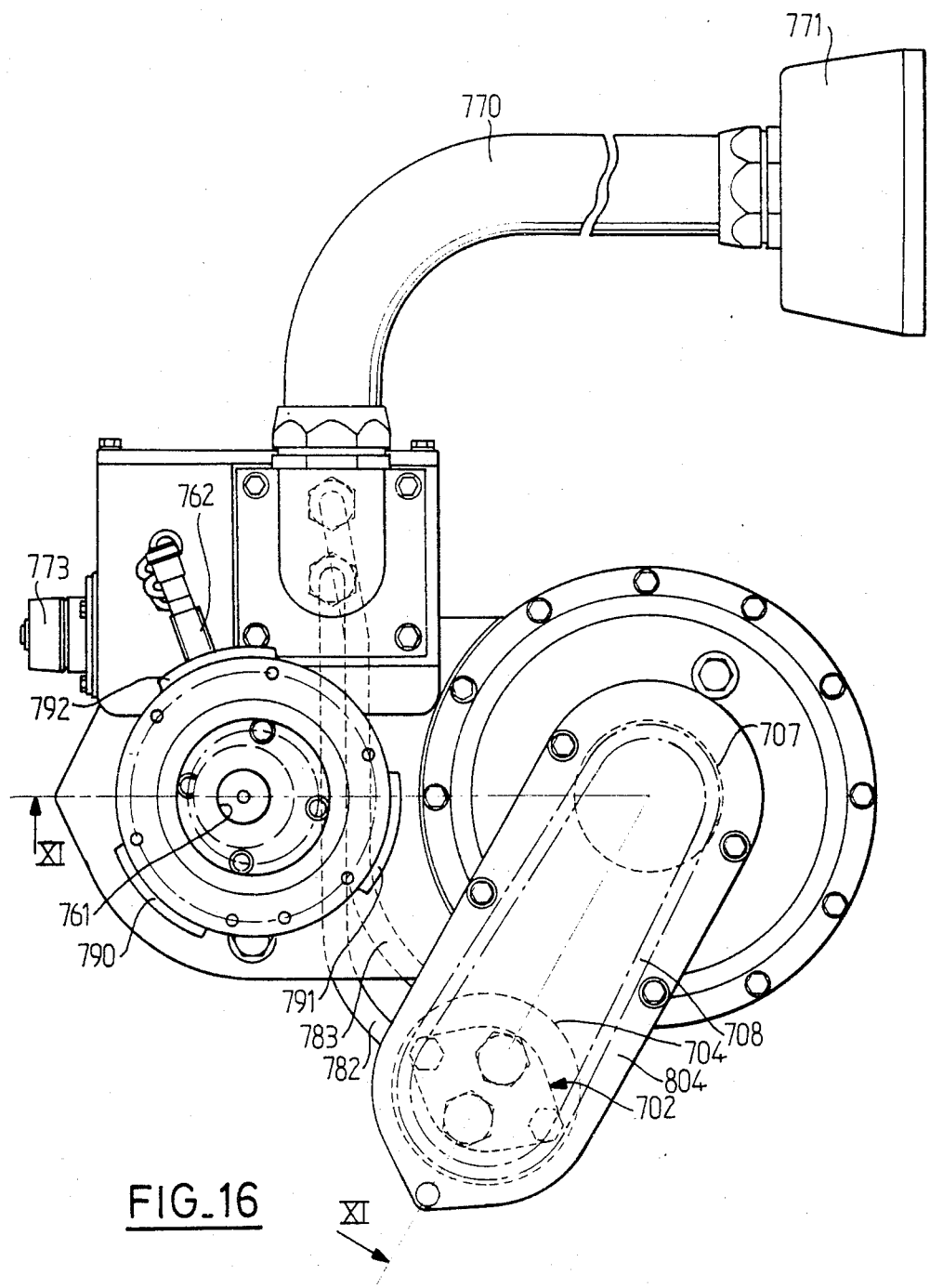
FIG. 16 shows an axial view of the brushing device in schematic representation as seen in the direction of the arrow XVI in FIG. 11.
Figure 19:
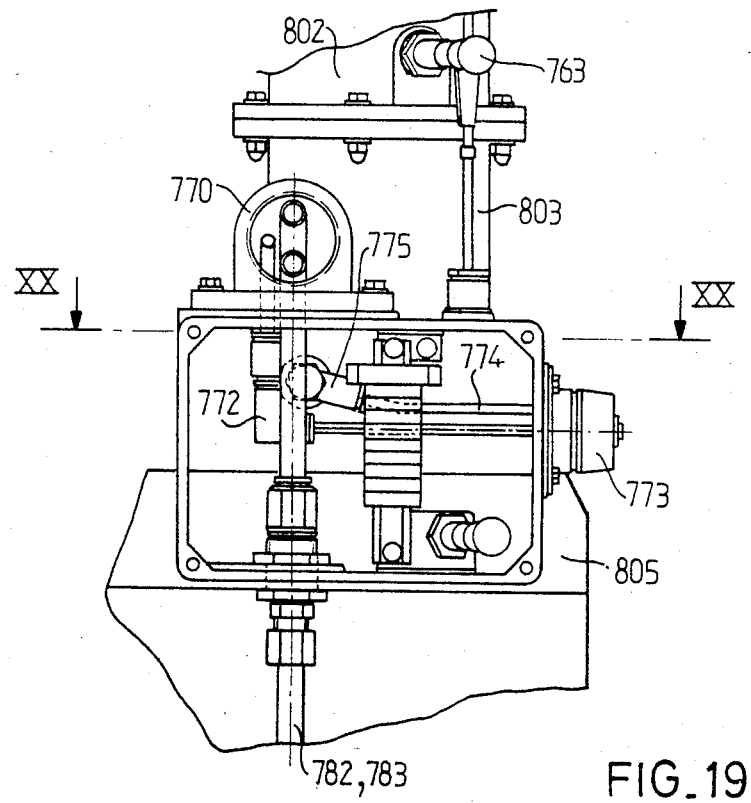
FIG. 19 shows another view of this casing as seen in the direction of the arrow XIX in FIG. 18.
Figure 20:
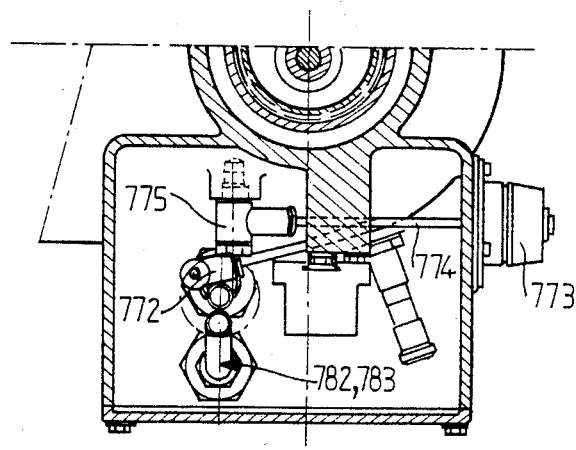
FIG. 20 shows a view of the casing in cross-section on the cross-section plane denoted XX—XX in FIG. 19.

As shown in FIG. 16, the nut 753 is provided with a plurality of projections 790, 791, 792 which emerge through the exterior of the casing 800. The projections 790, 791 and 792 are in the form of sectors of a ring centered on the axis 701. They are complementary to the projections 387 provided on the clamping ring 385.

Thus to fix the brushing device shown in FIGS. 11 through 21 onto the sleeve 380 it is sufficient to insert the front member 801 of the casing 800 into the sleeve 380, taking care to offset the projections 790, 791, 792 of the casing 800 angularly relative to the projections 387 on the clamping ring 385. When the projections 790, 791 and 792 rest against the flange 388 the clamping ring 385 is rotated about the axis 381 using the handle 386. The brushing device is then immobilized firmly by this bayonet-type coupling.

The man skilled in the art will readily understand from reading the foregoing description that once the fixed frame 100 has been fixed into the orifice O the functioning of the apparatus in accordance with the present invention may be controlled entirely automatically. The rotation of the mobile frame 300, the operation of the self-centering actuators 340 and the starting up of the pneumatic motor 702 may be controlled by a programmable automatic controller.

Also, the device in accordance with the present invention may be used to brush threaded bores of different pitches merely by changing the pitch of the screw 750 and of the nut 753 to suit the bore to be brushed. In the case where the cross-section of the threaded bores varies, it is of course necessary to adapt the intermediate shaft 733, the screw 750 and the ring 528 so that the radius of rotation of the main axis 502 corresponds to the cross-section of the bore.

The invention is not limited to the specific embodiment that has just been described, or course, but encompasses any variations thereon within the scope of the invention.

We claim:

1. Device for brushing threaded bores, comprising a mobile assembly, a brush on said mobile assembly rotatable about a main axis parallel in use to the axis of said threaded bore, main drive means for rotating said brush about said main axis and auxiliary drive means for moving said mobile assembly along a helical path centered in use on said axis of said threaded bore.

2. Device according to claim 1, further comprising drive motor means common to said main and auxiliary drive means.

3. Device according to claim 1, further comprising pneumatic drive motor means adapted to drive said main and auxiliary drive means.

4. Device according to claim 1, wherein said auxiliary drive means comprise a clutch adapted to serve as a torque limiter.

5. Device according to claim 4, wherein said clutch comprises a driving plate, a driven plate, balls disposed between said driving plate and said driven plate and spring means adapted to urge said driving plate and said driven plate towards each other.

6. Device according to claim 1, wherein said auxiliary drive means comprise an epicyclic gear train.

7. Device according to claim 1, wherein said auxiliary drive means comprise a screw adapted to be rotated about an axis coincident in use with the axis of said threaded bore, a nut meshing with said screw and a fixed casing carrying said nut which carries said mobile assembly, the arrangement being such that in use said main axis is spaced from and rotates about the axis of said threaded bore.

8. Device according to claim 7, wherein said screw comprises longitudinal splines over part of its length and further comprising a drive shaft which comprises complementary longitudinal splines meshing with said longitudinal splines on said screw, whereby a rotational coupling is provided between said screw and said drive shaft and relative movement in translation is enabled between said screw and said drive shaft.

9. Device according to claim 7, wherein said screw comprises an eccentric bore adapted to receive said mobile assembly.

10. Device according to claim 9, wherein said mobile assembly comprises a brush support shaft which is able to rotate in said eccentric bore and unable to move in translation relative to said screw.

11. Device according to claim 7, further comprising two tubes nesting telescopically one within the other, one of which is attached to said screw and the other of which is attached to said drive shaft, said tubes being adapted to convey compressed air to said brush.

12. Device according to claim 1, wherein said mobile assembly comprises a brush support shaft which has longitudinal splines over part of its length and further comprising a drive shaft which has complementary splines meshing with said splines on said brush support shaft, whereby a rotational coupling is provided between said brush support shaft and said drive shaft and relative movement in translation is enabled between said brush support shaft and said drive shaft.

13. Device according to claim 1, wherein said mobile assembly comprises a journal and further comprising a toothed wheel on said journal centered on said main axis and a toothed drive ring centered in use on the axis of said threaded bore and meshing with said toothed wheel.

14. Device according to claim 13, wherein said auxiliary drive means comprise a screw adapted to be rotated about an axis coincident in use with the axis of said threaded bore, a nut meshing with said screw and a fixed casing carrying said nut which carries said mobile assembly, the arrangement being such that in use said main axis is spaced from and rotates about the axis of said threaded bore, the device further comprising a lubrication circuit incorporating two pipes nested telescopically one within the other, one of which is attached to said screw and the other of which is attached to said drive shaft, and an oil pump formed by said toothed wheel and said toothed ring.

15. Support apparatus for a device for brushing threaded bores, said device comprising a mobile assembly, a brush on said mobile assembly rotatable about a main axis parallel in use to the axis of said threaded bore, main drive means for rotating said brush about said main axis and auxiliary drive means for moving said mobile assembly along a helical path centered in use on said axis of said threaded bore, said apparatus being adapted to be fixed into an orifice in a wall and comprising a fixed frame, a system of jaws on said frame adapted to come into contact with a first surface of the wall, a plurality of claws on said fixed frame, drive means adapted to displace said claws between an idle, retracted position in which said claws are able to pass through said orifice and an operative, extended position in which said claws bear against a second surface of the wall, at the periphery of said orifice.

16. Apparatus according to claim 15, further comprising a mobile frame adapted to carry said brushing device, supported on said fixed frame and freely rotatable about a pivot axis coincident in use with the axis of said orifice, and secondary drive means adapted to procure controlled pivoting of said mobile frame about said pivot axis.

17. Apparatus according to claim 16, comprising on said mobile frame at least one self-centering actuator adapted to enter a threaded bore at the periphery of said orifice and a support for said brushing device.

18. Apparatus according to claim 17, wherein said at least one actuator comprises two actuators in a cascade arrangement whereby a centering member may be moved between three positions.

19. Apparatus according to claim 17 wherein said support for said brushing device comprises bayonet coupling means.

20. Apparatus according to claim 15, wherein said claws are articulated to said fixed frame and further comprising a plate adapted to be driven in translation parallel to said pivot axis and spring links articulated to said plate and adapted to move said claws.

21. Apparatus according to claim 20, further comprising a pneumatic motor, a screw driven by said pneumatic motor and a nut meshing with said screw and adapted to drive said plate in translation parallel to said pivot axis.

22. Apparatus according to claim 15, further comprising an emergency withdrawal mechanism adapted to respond to failure of said drive means by procuring rapid return movement of said claws from said operative, extended position to said idle, retracted position.

23. Apparatus according to claim 22, wherein said mechanism comprises levers articulated to said fixed frame serving as articulated supports for said claws and retractable abutment means adapted to prevent pivoting of said levers under normal operating conditions.

24. Apparatus according to claim 23, wherein said mechanism comprises a plate adapted to move in translation parallel to said pivot axis, oblong housings in said plate, balls in said housings and cavities in said plate adapted to receive said balls to enable pivoting of said levers.

25. Apparatus according to claim 22, wherein in use in the normal operating position the axis about which said claws are articulated to said levers is radially inside the axis about which said levers are articulated to said fixed frame relative to the axis of the bore.

* * * * *

UNITED STATES PATENT AND TRADEMARK OFFICE
CERTIFICATE OF CORRECTION

PATENT NO. : 4,805,253

DATED : February 21, 1989

INVENTOR(S) : Hanser

It is certified that error appears in the above-identified patent and that said Letters Patent is hereby corrected as shown below:

On the title page, item [73], the assignee's name should read
--Creation de Mecanismes, d'Automatismes et
d'Asservissements--

Signed and Sealed this

Second Day of April, 1991

Attest:

HARRY F. MANBECK, JR.

*Attesting Officer*     *Commissioner of Patents and Trademarks*